United States Patent
Moore et al.

(10) Patent No.: US 11,618,545 B2
(45) Date of Patent: Apr. 4, 2023

(54) VTOL AIRCRAFT FOR NETWORK SYSTEM

(71) Applicant: Joby Aero, Inc., Santa Cruz, CA (US)

(72) Inventors: Mark Moore, San Francisco, CA (US); Nikhil Goel, San Francisco, CA (US); John Conway Badalamenti, San Francisco, CA (US); Jon D. Petersen, Walnut Creek, CA (US); David Josephson, Santa Cruz, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 16 days.

(21) Appl. No.: 17/467,702

(22) Filed: Sep. 7, 2021

(65) Prior Publication Data
US 2022/0055733 A1     Feb. 24, 2022

Related U.S. Application Data

(63) Continuation of application No. 16/053,753, filed on Aug. 2, 2018, now Pat. No. 11,136,105.
(Continued)

(51) Int. Cl.
| | |
|---|---|
| *B64C 1/14* | (2006.01) |
| *B64D 11/06* | (2006.01) |
| *B64C 29/00* | (2006.01) |
| *B64C 1/24* | (2006.01) |
| *B64C 11/46* | (2006.01) |
| *E05F 15/70* | (2015.01) |

(52) U.S. Cl.
CPC .......... *B64C 1/1438* (2013.01); *B64C 1/1423* (2013.01); *B64C 29/0008* (2013.01);
(Continued)

(58) Field of Classification Search
CPC . B64C 1/1438; B64C 1/1423; B64C 29/0008; B64C 1/24; B64C 11/46;
(Continued)

(56) References Cited

U.S. PATENT DOCUMENTS

| | | |
|---|---|---|
| 6,189,833 B1 | 2/2001 | Ambrose |
| 2002/0104176 A1* | 8/2002 | Thomas ................. B64F 1/305 14/71.5 |

(Continued)

OTHER PUBLICATIONS

Uber, "Fast-Forwarding to a Future of On-Demand Urban Air Transporation Introduction", Uber Elevate, https: www.uber.com elevate.pdf, retrieved on Nov. 26, 2018, Oct. 27, 2016, pp. 14, 15, 27-32, 38-40, 79, and 80.

*Primary Examiner* — Rodney A Bonnette
(74) *Attorney, Agent, or Firm* — Dority & Manning, P.A.

(57) ABSTRACT

A vertical take-off and landing (VTOL) aircraft provides transportation to users of a network system. The network system may include multiple aircraft or other types of vehicles to provide multi-model transportation. An aircraft may include a fuselage, a truss coupled to the fuselage, and multiple distributed electric propellers coupled to the truss. The distributed electric propellers may be positioned on at least two different planes. The fuselage may include a cabin having one or more seats for the passengers arranged in a configuration that has a compact footprint, provides legroom, provides visibility to surroundings of the aircraft, or facilitates convenient ingress or egress of passengers. The aircraft may open a port cabin door and starboard cabin door for simultaneous ingress or egress of passengers.

20 Claims, 26 Drawing Sheets

Related U.S. Application Data

(60) Provisional application No. 62/541,050, filed on Aug. 3, 2017, provisional application No. 62/540,517, filed on Aug. 2, 2017.

(52) U.S. Cl.
CPC ............ B64D 11/0601 (2014.12); *B64C 1/24* (2013.01); *B64C 11/46* (2013.01); *B64D 11/062* (2014.12); *B64D 11/0606* (2014.12); *E05F 15/70* (2015.01); *E05Y 2400/44* (2013.01); *E05Y 2900/502* (2013.01)

(58) Field of Classification Search
CPC .......... B64D 11/0601; B64D 2045/007; E05Y 2400/44; E05Y 2400/81; E05Y 2900/502
See application file for complete search history.

(56) References Cited

U.S. PATENT DOCUMENTS

| | | | |
|---|---|---|---|
| 2013/0068890 A1* | 3/2013 | Boren | B64C 1/1423 244/137.2 |
| 2014/0125355 A1* | 5/2014 | Grant | B61D 33/0057 324/629 |
| 2014/0300152 A1 | 10/2014 | Park | |
| 2015/0076280 A1 | 3/2015 | Cox | |
| 2015/0217873 A1 | 8/2015 | Cox | |
| 2015/0259076 A1* | 9/2015 | Koyama | B64D 11/00151 340/945 |
| 2017/0144774 A1 | 5/2017 | Pollard | |
| 2019/0315471 A1* | 10/2019 | Moore | B64C 17/00 |
| 2020/0130837 A1 | 4/2020 | Sealey | |
| 2021/0331796 A1* | 10/2021 | Moreau | B64D 27/02 |

\* cited by examiner

Top View · Front View

Front View

Front View

Front View

VTOL AIRCRAFT FOR NETWORK SYSTEM

CROSS-REFERENCE TO RELATED APPLICATIONS

This application is a continuation of U.S. patent application Ser. No. 16/053,753 filed on Aug. 2, 2018, which claims priority to U.S. Provisional Patent Application Ser. No. 62/540,517 filed on Aug. 2, 2017, and U.S. Provisional Patent Application Ser. No. 62/541,050 filed on Aug. 3, 2017, all of which are incorporated by reference herein in their entirety for all purposes.

BACKGROUND

1. Field

The present disclosure generally relates to vertical take-off and landing (VTOL) aircraft, and particularly to VTOL aircraft for providing transportation services.

2. Description of the Related Art

Developments in VTOL-related technologies have made it possible to build and support an urban VTOL network. VTOL aircraft using electric propulsion may have zero operational emissions and can operate quietly to not contribute to noise pollution, which is caused by traditional types of aircraft such as helicopters and passenger planes. The tops of existing buildings such as parking garages, helipads, or even unused land surrounding highway interchanges may be re-purposed as landing pads or charging stations for VTOL aircraft. However, challenges remain in creating and operating a VTOL network that offers a practical and safe mode of transportation at scale while also providing a quality user experience.

Figure 1:
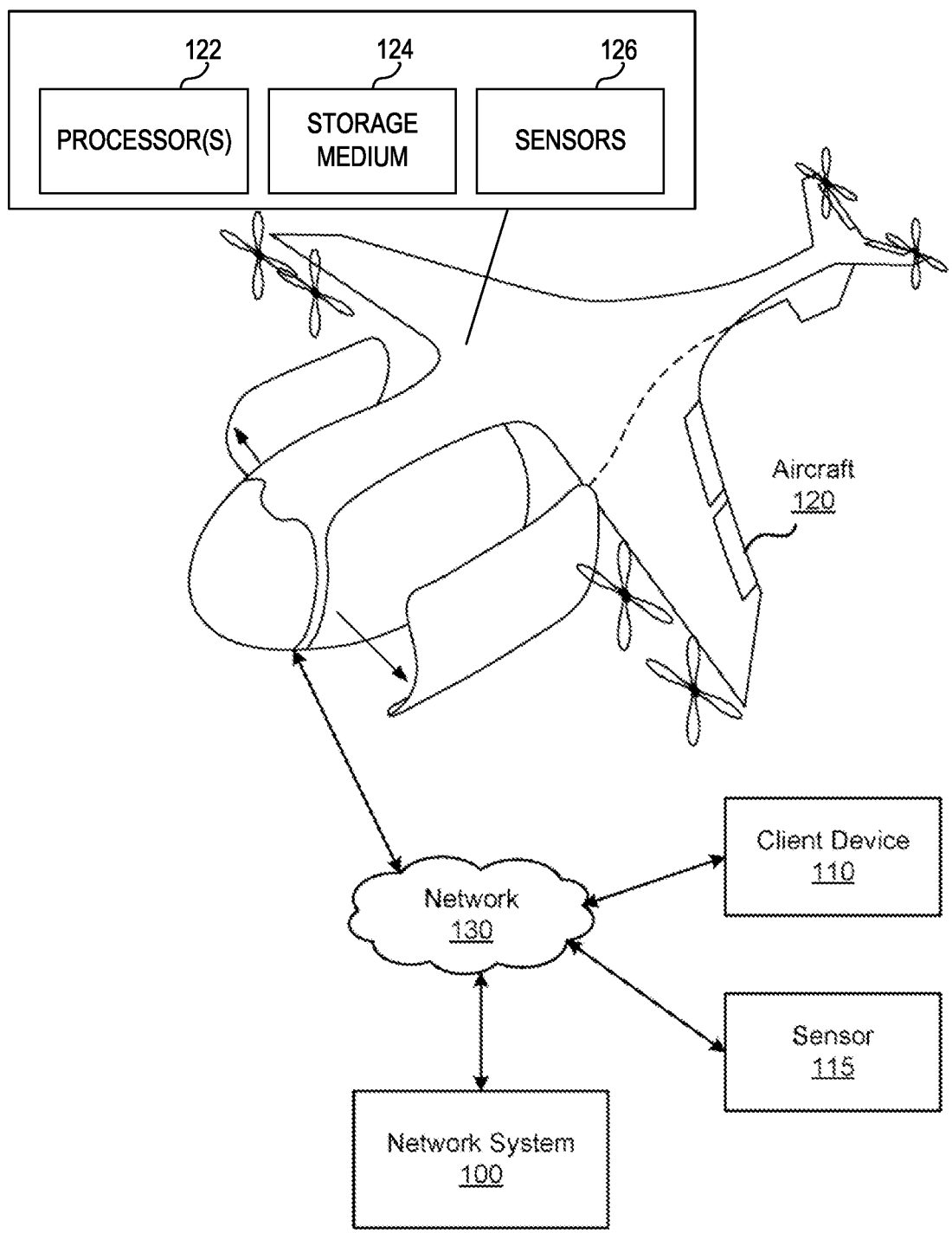
FIG. 1 is a diagram of a system environment for a network system for VTOL aircraft according to one embodiment.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A vertical take-off and landing (VTOL) aircraft provides transportation to users of a network system. In various embodiments, the VTOL aircraft may include sensors for detecting objects, which may be potential obstacles in a navigation route of the VTOL aircraft. The VTOL aircraft may use an estimated location of the detected object to modify the navigation route. The VTOL aircraft may also transmit the location of the detected object to a different VTOL aircraft. In an embodiment, the VTOL aircraft comprises a fuselage including a cockpit and a cabin for passengers. The cabin may be separated from the cockpit by a cockpit wall angled relative to a lateral axis of the VTOL aircraft. The cabin may include one or more seats for the passengers including at least a first seat and a second seat adjacent to the first seat. The seats may be arranged in a configuration that has a compact footprint, provides legroom, provides visibility to surroundings of the VTOL aircraft, or facilitates convenient ingress or egress of passengers. The cabin may also include a port cabin door for simultaneous ingress of the passengers to the first seat and the second seat. The cabin may also include a starboard cabin door for simultaneous egress of the passengers from the first seat and the second seat. The cabin may also include a privacy wall separating the first seat from the second seat, for example, to provide a sound barrier for passengers to take a phone call or sleep.

In an embodiment, an aircraft includes a cabin, one or more processors, and a computer program product. The cabin includes multiple seats including at least a first seat and a second seat, a port cabin door, and a starboard cabin door. The computer program product comprises a non-transitory computer readable storage medium having instructions encoded thereon that, when executed by the one or more processors, cause the one or more processors to perform one or more steps. The steps may include determining that the aircraft is ready (e.g., landed) for egress and ingress of passengers. Additionally, the steps may include providing a first instruction to open the starboard cabin door for egress of a first set of passengers from the first seat and the second seat, and providing a second instruction to open the port cabin door for ingress of a second set of passengers to the first seat and the second seat simultaneously with the egress of the first set of passengers. The doors may be opened responsive to the determination that the aircraft is ready for egress and ingress of passengers. The steps may also include determining that the second set of passengers are seated in the first and second seats. In some embodiments, responsive to determining that the second set of passengers are seated in the first and second seats, the aircraft may perform takeoff to navigate to a destination location.

I. System Overview

FIG. 1 is a diagram of a system environment for a network system 100 for VTOL aircraft according to one embodiment. Users of the network system 100 may include providers that provide service to other users. Users may both receive service and provide service as providers of the network system 100. In an example use case, a provider (also referred to herein as a "pilot") operates a VTOL aircraft 120 (also referred to herein as an "aircraft") to transport a user (also referred to herein as a "passenger") from a pickup location to a destination location. In some embodiments, the aircraft 120 is autonomous and does not require pilot for operation. Though this disclosure refers to VTOL aircraft for purposes of explanation, the embodiments described herein may also be applicable to conventional take-off and landing (CTOL) aircraft or other types of aircraft. The network system 100 may determine pickup locations and coordinate providers to pick up users at the pickup locations. Further, the network system 100 may coordinate a multi-modal trip, for example, including a first trip segment traveled via an aircraft and a second trip segment traveled via another type of vehicle. For instance, passengers ride in a car operated by a driver (or an autonomous car) to and from aircraft landing pads to transition to riding in an aircraft. Other types of services provided by the network system 100 include, for example, delivery of goods, data collection, or access to areas not accessible by ground transportation.

The system environment includes the network system 100, one or more client devices 110, one or more sensors 115, and one or more aircraft 120. Any number of components in the system environment may be connected to each other via a network 130 (e.g., the Internet). Components may directly communicate with each other or indirectly through another component. For instance, a sensor 115 may transmit sensor data directly to an aircraft 120, or transmit sensor data to the network system 100 to be provided to an aircraft 120. In other embodiments, different or additional entities can be included in the system environment.

A user can interact with the network system 100 through the client device 110, e.g., to request service, receive requests to provide service, receive routing instructions, or receive aircraft information. A client device 110 can be a personal or mobile computing device, such as a smartphone, a tablet, or a notebook computer, or, in the case of a provider, may be part of the avionics of an aircraft 120, dashboard electronic, or other integrated systems. In some embodiments, a provider may use a client device 110 that is a separate device than the aircraft 120. In some embodiments, the client device 110 executes a client application that uses an application programming interface (API) to communicate with the network system 100 through the network 130.

In one embodiment, through operation of a client device 110, a user requests service via the network system 100. A provider uses a client device 110 to interact with the network system 100 and receive invitations to provide service to users. For example, the provider may be a qualified pilot operating the aircraft 120 (or a driver of a vehicle) capable of transporting users. In some embodiments, the provider is an autonomous or semi-autonomous aircraft that receives routing instructions from the network system 100. The network system 100 may select a provider from a pool of available providers to provide a trip requested by a user. The network system 100 transmits an assignment request to the selected provider's client device 110.

The aircraft 120 includes one or more seats for transporting passengers of the network system 100. In embodiments where the aircraft 120 is at least partially human-operated, the aircraft 120 may also include a seat for a pilot. Passengers or the pilot may enter or exit the aircraft through one or more doors of the aircraft 120. The perspective view of an example aircraft 120 shown in FIG. 1 includes two doors that open laterally, for example, along sliding rails or using another type of actuator, passive mechanism, or combination thereof. Though in other embodiments, the aircraft 120 may have a different configuration or type of doors, e.g., doors that rotate to open. The aircraft 120 may include multiple distributed electric propellers, powered rotors, or other means of propulsion that enable the aircraft 120 to hover, take off, or land approximately vertically.

The aircraft 120 may include one or more types of sensors for various functionality such as navigation, passenger monitoring, or obstacle detection or avoidance, among other relevant applications. For example, the aircraft 120 may include at least one global positioning system (GPS) sensor, motion sensor, gyroscope, accelerometer, or other motion sensor to determine and track position or orientation of the aircraft 120. Moreover, the aircraft 120 may include at least one passive (or active) optical sensor, laser-based LiDAR sensor, radar, passive (or active) acoustic sensor, camera, or other sensors suitable for object detection or object location estimation. Furthermore, the aircraft 120 include at least one temperature sensor, pressure sensor, ambient light sensor, altitude sensor, or other sensors suitable for collecting information describing weather conditions or surroundings of the aircraft 120. The aircraft 120 may transmit sensor data to another component in the system environment such as a different aircraft 120 or the network system 100.

In some embodiments, the aircraft 120 includes one or more sensors for verifying passenger behavior. The cockpit may include a user interface (e.g., associated with a client device 110) that presents aircraft or passenger information based on data from the sensors. For example, a seatbelt includes a sensor that detects whether a passenger has buckled the seatbelt. The user interface may include an electronic display, lights, or other indicators that show which passengers are fastened in properly, improperly fastened, or not fastened. As another example, a cabin of the aircraft 120 includes one or more cameras directed to seats of the passengers, and an electronic display of the user interface may show a video feed or images captured by the cameras. Thus, the pilot may use the user interface to verify that the passengers have buckled-in for take-off, have exited from the aircraft 120 after a trip ends, are conforming to safety guidelines during a trip, or have completed any other particular action. In embodiments where the aircraft 120 is autonomous, the aircraft 120 may present information to passengers responsive to determining that they are not properly buckled-in or prepared for take-off. For instance, the aircraft 120 presents a message (e.g., informing a passenger to secure a seatbelt or stow luggage) on an on-board electronic display or transmits a message for display on a client device 110 of the passenger. The aircraft 120 and accompanying sensors are further described below in various sections.

In addition to sensors of an aircraft 120, the system environment may also include one or more sensors 115 off-board or physically separate from the aircraft 120. A sensor 115 may be ground-based, e.g., mounted to a building or stationary structure. In some embodiments, a sensor 115 is coupled to a moving object such as a ground, sea, or air-based vehicle. In other embodiments, a sensor 115 may be coupled to a weather balloon in air, a weather buoy on water, or a satellite in space. A sensor 115 may be moored or tethered to another system that aggregates sensor data, for instance, from multiple sensors 115. A sensor 115 may transmit sensor data, or information determined based on processing sensor data, to the network system 100 or an aircraft 120. In some embodiments, a sensor 115 is included in a client device 110.

II. Example Process Flows

II. A. Example Sensor Data Transmission

Figure 2A:
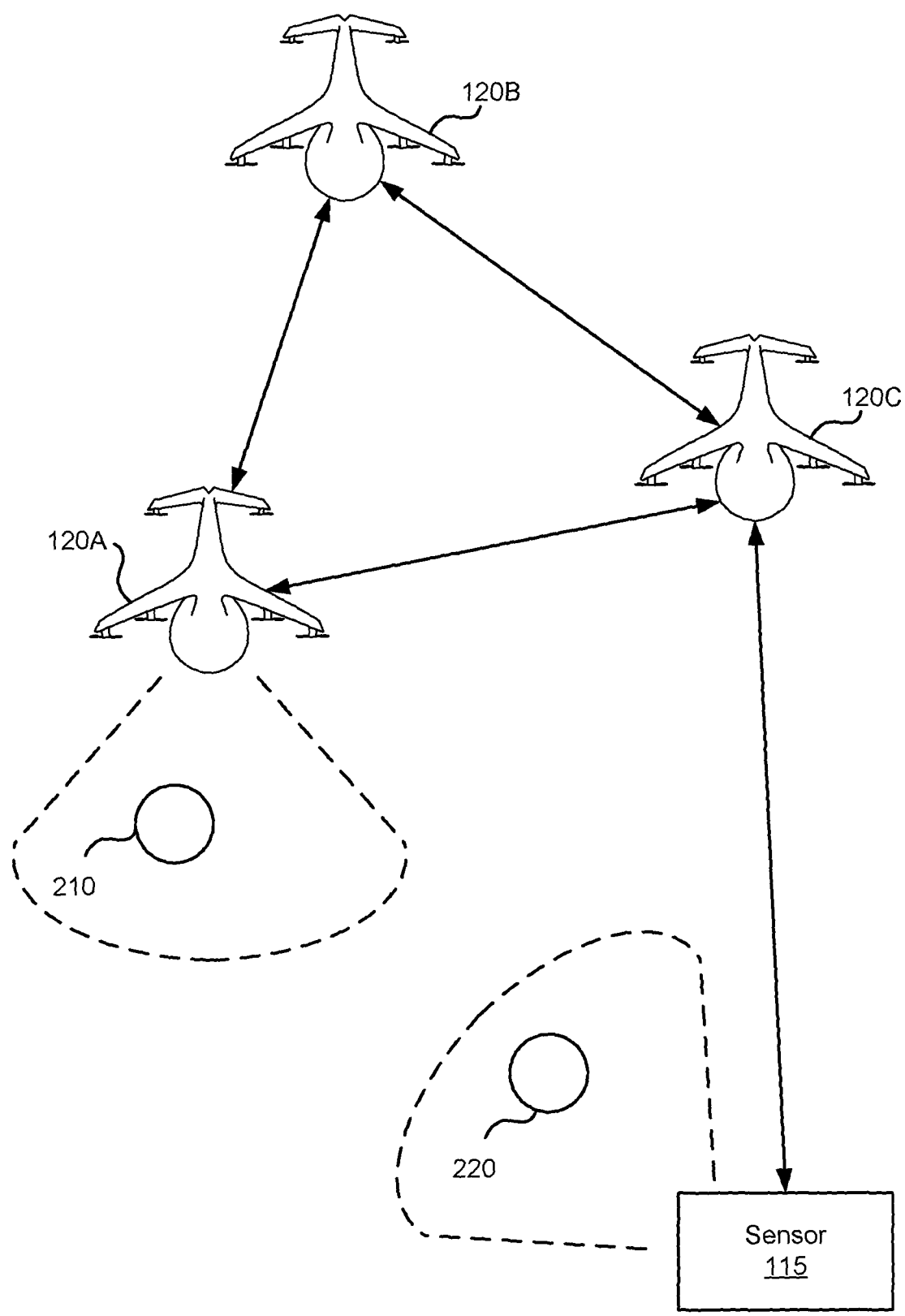
FIG. 2A is a diagram of sensor data transmission between aircraft according to one embodiment.

FIG. 2A is a diagram of sensor data transmission between aircraft according to one embodiment. In the example shown in FIG. 2A, aircraft 120A, 120B, and 120C are communicatively coupled to each other over the network 130, for instance, a high-speed and low-latency network. The network may interconnect any number of aircraft 120 within a threshold network distance (or radius). The aircraft 120 may share sensor data with each other or with the network system 100 for safety applications, collision avoidance, hazard awareness, mission planning, navigation, among other functionality. As an example use case, the aircraft 120A includes an active radar sensor that detects at least one object 210. The object 210 may be a bird in a flock of birds, a balloon, cloud, drone, an uncharted object, another aircraft (which may not necessarily be associated with the network system 100), or any other object detectable by a sensor of the aircraft 120A. In some embodiments, the aircraft 120A may determine an estimated location of the object 210 by processing sensor data, e.g., from distance or imaging sensors.

The aircraft 120A may transmit sensor data information (e.g., including sensor data or an estimated location of the object 210) to the network system 100. Additionally, the aircraft 120A may broadcast the sensor data information to one or more other aircraft 120 in vicinity of the aircraft 120A (e.g., within the threshold network distance). In the illustrated example, the aircraft 120B and 120C may receive the sensor data information from the aircraft 120A or indirectly via the network system 100. In an embodiment, one or more of the aircraft may use the sensor data information to update a navigation route. In particular, the detected object 210 may be an obstacle that should be avoided to prevent a collision. In some embodiments, the network system 100 or any one of the aircraft may estimate a projected path or motion of the detected object 210 and use the estimation to predict a modified navigation route to reduce the likelihood of collision. Though the object 210 may be outside of a detectable range of sensors of the aircraft 120B and 120C at a given point in time, the aircraft 120B and 120C may anticipate the object 210 as an obstacle (e.g., before the object 210 enters the detectable range) based on the sensor data information transmitted by aircraft 120A. Thus, the aircraft 120B and 120C may have a greater amount of time or distance to modify a navigation route for avoiding the object 210.

In some embodiments, any of the aircraft may also be communicatively coupled to one or more off-aircraft sensors 115. In the example shown in FIG. 2A, the sensor 115 detects another object 220 and transmits sensor data information (e.g., estimated location of the object 220) to the aircraft 120C. The sensor 115 may also transmit the sensor data information to other aircraft 120 or client devices 110, or the aircraft 120C may route the sensor data information over a network to the other aircraft 120. In addition to sensor data information collected by sensors on-board an aircraft, the aircraft can also use sensor data information collected by off-aircraft sensors 115 for any of the above described functionalities such as navigation.

Figure 2B:
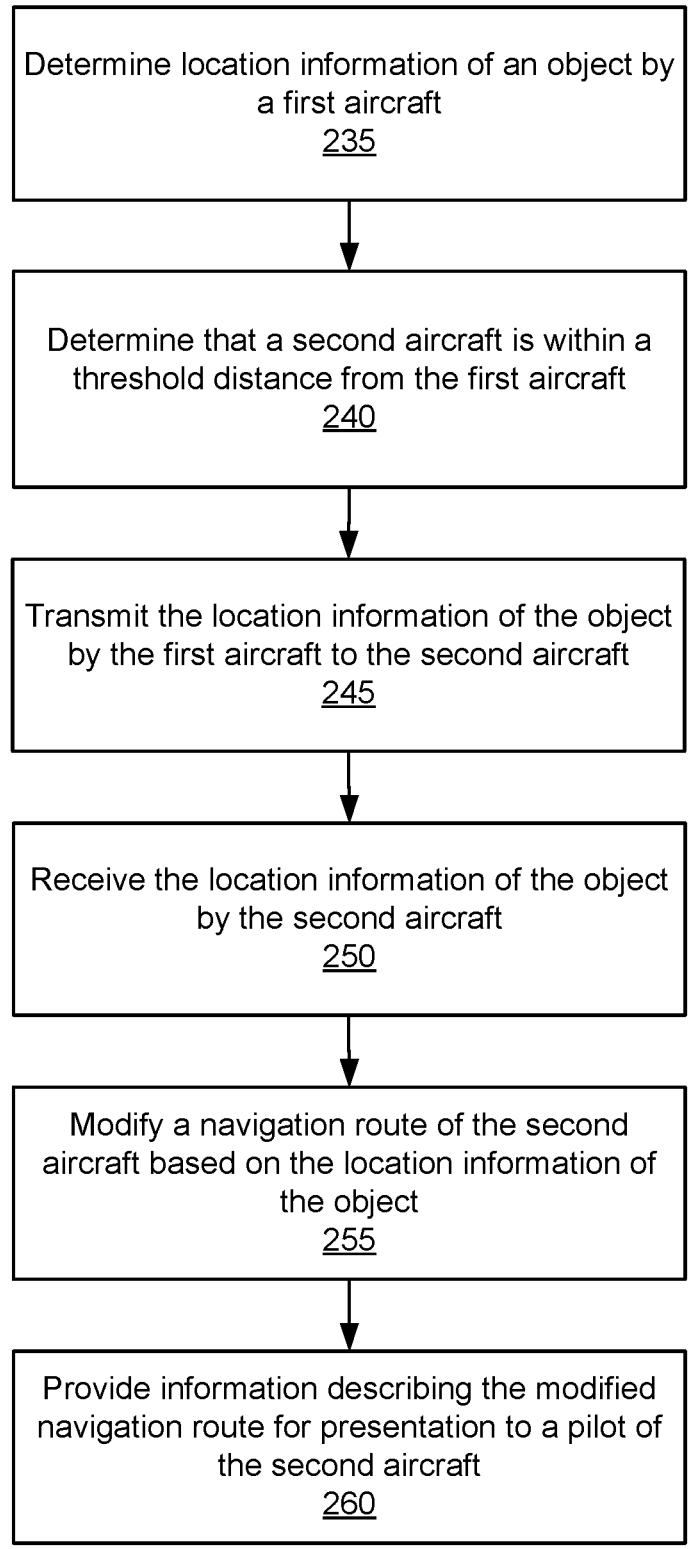
FIG. 2B is a flowchart of a process for sensor data transmission between aircraft according to one embodiment.

FIG. 2B is a flowchart of a process 230 for sensor data transmission between aircraft according to one embodiment. In some embodiments, steps of the process 230 are performed by the network system 100 or one or more aircraft 120 within the system environment in FIG. 1 or FIG. 2A. The process 230 may include different, fewer, or additional steps than those described in conjunction with FIG. 2B in some embodiments or perform steps in different orders than the order described in conjunction with FIG. 2B.

In an embodiment, a first aircraft 120A determines 235 location information of an object. The location information may include a current location of the object, an estimated location of the object at a future point in time, or motion information indicating change in location (e.g., a flight path). An estimate of location may be determined in three-dimensional space using triangulation based on distance measurements from two or more or distance sensors, or using any other suitable techniques known to one skilled in the art, e.g., machine learning algorithms or image processing using images or video captured by a camera. In some embodiments, the first aircraft 120A may determine other attributes of the object including one or more of a size, quantity, type, color, or risk level of the object. For instance, a balloon having a small size is associated with a lower risk level relative to an unresponsive aircraft having a larger size. The first aircraft 120A may also determine a confidence level or margin of error associated with the location information of the object, for instance, indicating a degree of certainty regarding accuracy of the estimated location.

The first aircraft 120A determines 240 that a second aircraft 120B is within a threshold distance from the first aircraft 120. The threshold distance may be based on the threshold network distance. For instance, multiple aircraft within proximity of each other may connect to the network 130 to transmit or receive information. The first aircraft 120A may query the network system 100 for data to determine whether there are any nearby aircraft 120 or locations of the nearby aircraft. The first aircraft 120A may also broadcast requests to another aircraft to determine locations or presence of other aircraft. In some embodiments, the first aircraft 120A may store information describing nearby aircraft in on-board memory such as cache or a flight log. The first aircraft 120A can determine whether the second aircraft 120B is within a threshold distance using the locations of the first and second aircraft 120A and 120B, e.g., by calculating a distance between the two aircraft for comparison to the threshold distance.

Responsive to determining that the second aircraft 120B is within the threshold distance, the first aircraft 120A transmits 245 the location of the object to the second aircraft 120B. One or both of the first aircraft 120A and the second aircraft 120B may be airborne when the location is transmitted. In an embodiment, the first aircraft 120A may request and receive from the network system 100 (or another aircraft) an identifier, e.g., Internet Protocol (IP) address, transponder ID, serial number, or other data associated with the second aircraft 120B. The first aircraft 120A may transmit the location of the object using the identifier of the second aircraft 120B, for instance, to distinguish between multiple aircraft within close proximity.

The second aircraft 120B receives 250 the location information of the object from the first aircraft 120A, and in response modifies 255 a navigation route based on the received location information of the object. The modified navigation route may have a different flight path, speed, or altitude, for instance, to avoid a collision with the detected object at an estimated future location of the object. Based on motion information of the object, the second aircraft 120B may determine that the object is likely to intersect with a projected flight path of the second aircraft 120B at a future point in time. In some embodiments, the second aircraft 120B modifies the navigation route responsive to determining that a confidence level of an estimated location of the object is greater than a threshold confidence, determining that a likelihood of collision is greater than a threshold probability, or determining that an associated risk level is greater than a threshold level.

In embodiments where the second aircraft 120B is at least partially operated by a pilot, the second aircraft 120B provides 260 information describing the modified navigation route for presentation to the pilot of the second aircraft 120B. In an embodiment, the information includes a map presented in a graphical user interface on an electronic display of a client device 110 or the second aircraft 120B (e.g., a built-in monitor in the cockpit). The information may also be presented in other visual, textual, or audio form to the pilot. Responsive to determining that a confidence level of an estimated location of the detected object is less than a threshold confidence, the second aircraft 120B may present the pilot with an option to manually or automatically modify the navigation route. In some use cases, responsive to determining that an estimated likelihood of collision with the detected object is greater than a threshold probability, an aircraft may trigger or generate an alert, transmit an alert to another aircraft, or transmit the location of the detected object to another aircraft. In other embodiments where an aircraft is autonomous, the aircraft does not necessarily present information to a pilot or another user. The aircraft may automatically modify the navigation route or transmit information associated with the modified navigation route to the network system 100.

The first aircraft 120A and the second aircraft 120B may be associated with (e.g., owned by) the network system 100 or a different entity or third party such as an aircraft manufacturer or airline. Additionally, different aircraft operating in the system environment of the network system 100 may be associated with different entities or may have different user interface, electrical, mechanical, or other physical attributes (e.g., number or configuration of seats, propeller design, or range of flight). The aircraft of different entities may use at least a set of common protocols to communicate with each other, e.g., transmitting and receiving sensor data or location information of detected objects. Moreover, pilot-operated aircraft and autonomous aircraft may also exchange information with each other.

II. B. Example Control of Aircraft Doors

Figure 2C:
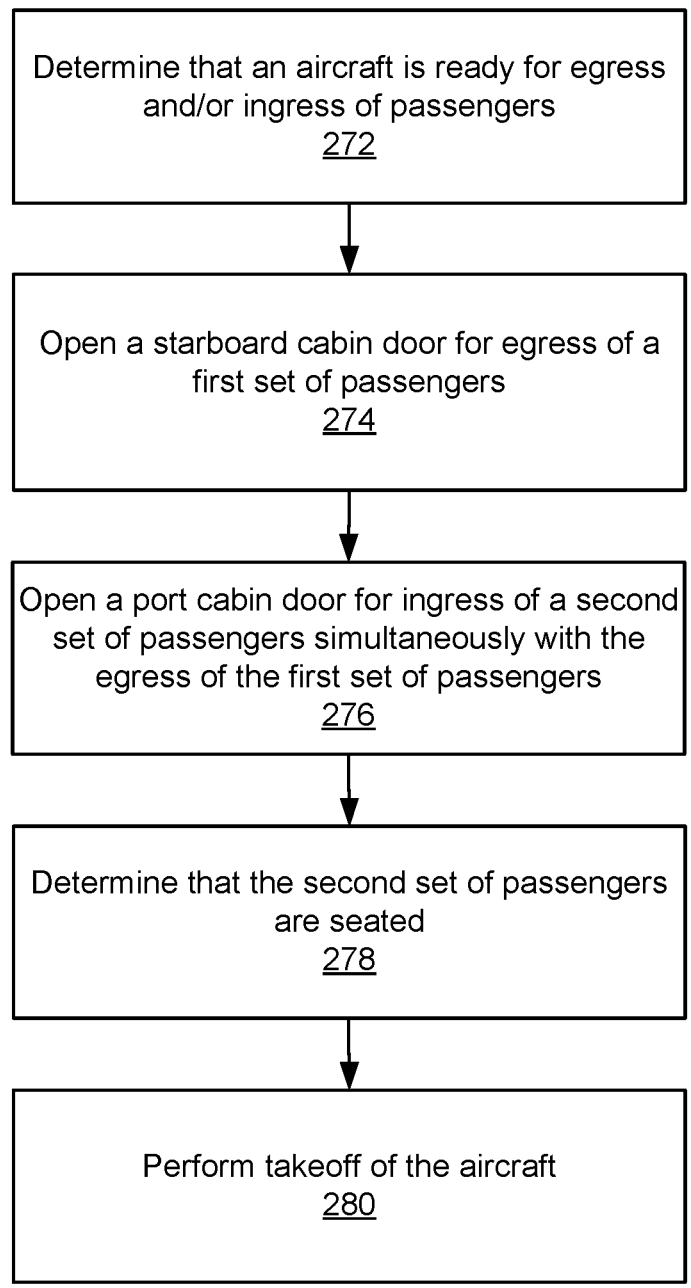
FIG. 2C is a flowchart of a process for control of doors of an aircraft according to one embodiment.

FIG. 2C is a flowchart of a process 270 for control of doors of an aircraft according to one embodiment. In an embodiment, the process 270 can be performed by one or more processors on the aircraft and/or a monitoring system at the present vertiport, e.g., an airport for VTOL aircraft.

In an embodiment, the process 270 includes determining 272 that the aircraft is ready for egress and/or ingress of passengers ("passenger loading"). For instance, the determination can be based on a number of factors, such as, but not limited to, the aircraft is stationary (e.g., landed or docked), the aircraft is within a permitted area for loading/unloading passengers (e.g., at a "passenger loading area"), the aircraft is in proper orientation within the passenger loading area, the aircraft is in a safe state for passenger loading or unloading (e.g., certain propellers are stopped and unpowered or locked), the vertiport is in a safe state for passenger loading/unloading (e.g., no danger presented by other aircraft or vehicles), or landing gear of the aircraft have been deployed.

Responsive to determining that the aircraft is ready for passenger loading, the aircraft may open one or more doors. In an example, the opening is performed automatically without human intervention. In particular, the aircraft opens 274 a starboard cabin door for egress of a first set of passengers from a first seat and a second seat (or any other number of seats in a cabin or the aircraft). The aircraft opens 276 a port cabin door for ingress of a second set of passengers to the first seat and the second seat simultaneously or concurrently with the egress of the first set of passengers. The starboard cabin door and port cabin door may be opened by rotating about a pivot, or laterally moving along sliding rails.

The process 270 also includes determining 278 that the second set of passengers are seated in the first and second seats. For instance, sensor data is used to determine that the passengers are properly seated, that the passengers have fastened seatbelts of the seats, or that the passengers have performed other safety protocols. In some embodiments, responsive to determining that the second set of passengers are seated in the first and second seats, the aircraft may perform 280 takeoff to navigate to a destination location.

While the process 270 is described above in the context of opening the starboard cabin door first and then the port cabin door, it will be appreciated that the cabin doors may be opened in the reverse order in alternative embodiments, or which side's cabin doors that open first may be determined dynamically based on the side that passengers will enter the aircraft or vehicle for the present vertiport.

While the process 270 is described above in the context of the simultaneous or concurrent egress and ingress of passengers, it will be appreciated that the cabin doors may be opened to allow sequential unloading and then loading of passengers.

III. Example Aircraft

Figure 3A:
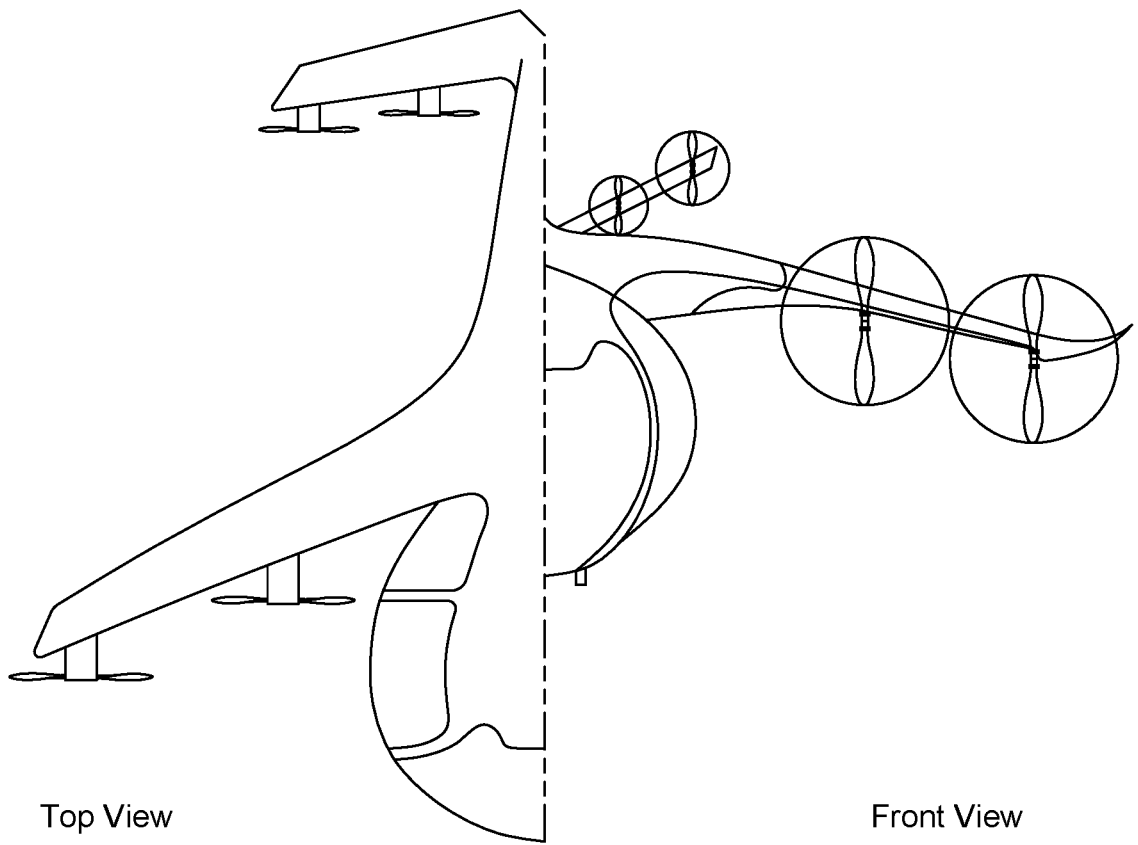
FIG. 3A is a diagram showing a top and front view of a portion of an aircraft according to one embodiment.

FIG. 3A is a diagram showing a top and front view of a portion of an aircraft 300 according to one embodiment. In the embodiment shown FIG. 3A, the cockpit of the aircraft 300 may be positioned at the nose of the aircraft 300. Additionally, the aircraft 300 may include windows in front of the cockpit for visibility of the pilot and windows on the (e.g., port and starboard) sides of the aircraft 300 for visibility of passengers. The illustrated aircraft 300 includes two powered rotors on each wing of the aircraft 300. In other embodiments, the aircraft 300 may include a different number or configuration of powered rotors, which is further described below with respect to FIGS. 3E-G.

Figure 3B:
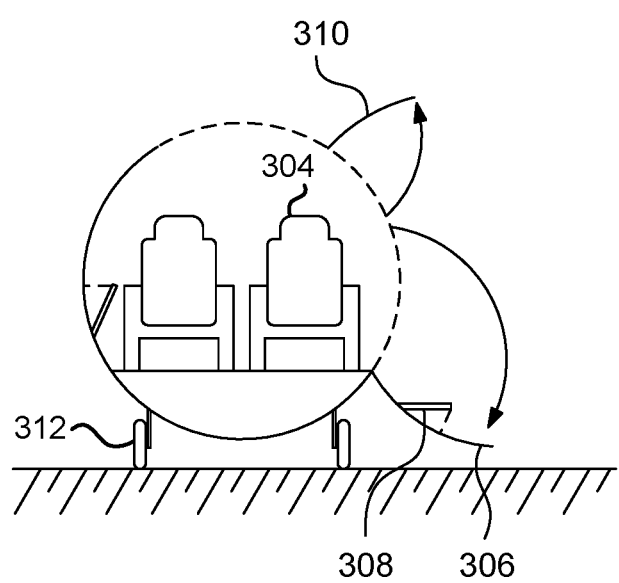
FIG. 3B is a diagram showing a cross-sectional front view of an aircraft according to one embodiment.

FIG. 3B is a diagram showing a cross-sectional front view of an aircraft 302 according to one embodiment. The aircraft 302 may include multiple seats 304 for passengers in the cabin. Any number of seats may be adjacent to each other, aligned to each other, or facing a same or different direction. In the example shown in FIG. 3B, the aircraft 302 includes a cabin door having at least two segments. A lower segment 306 of the cabin door rotates downward to provide one or more steps 308, or a ramp, for passenger ingress or egress. The structure of a step 308 on the lower segment 306 may also serve as storage space, e.g., for passenger belongings or other items such as maintenance or safety equipment, when the lower segment 306 is positioned in an upright or closed position. The upper segment 310 of the cabin door rotates upward to provide additional head clearance for passengers entering or exiting the cabin. The aircraft 302 includes landing gear 312 such as wheels for mobility and stabilization when the aircraft 302 is landed or taxiing.

Figure 3C:
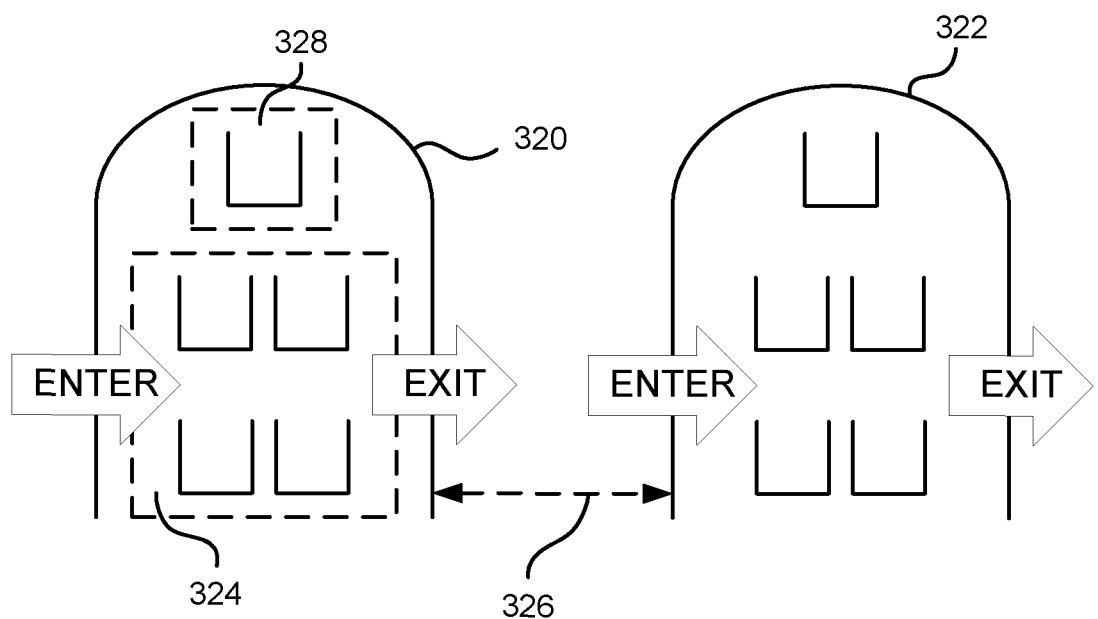
FIG. 3C is a diagram illustrating aircraft ingress and egress of passengers according to one embodiment.

FIG. 3C is a diagram illustrating aircraft ingress and egress of passengers according to one embodiment. In the embodiment shown in FIG. 3C, an aircraft 320 parks adjacent to another aircraft 322, for instance, on a landing pad or another suitable area for aircraft ingress and egress. Passengers exit the cabin 324 through the starboard side of the aircraft 320, for example, using a cabin door (not shown in FIG. 3C). Additionally, new passengers for a subsequent trip may enter the cabin 324 through the port side of the aircraft 320 using another cabin door. This one-way direction of passenger traffic may reduce the average time required for passenger egress and ingress between trips provided by the aircraft. In one embodiment, the aircraft can land for a trip and take off for the next trip within five minutes, including the time for passengers deplaning and boarding.

In addition to reducing passenger ingress or egress time, the one-way direction of passenger traffic may decrease a distance 326 between two or more aircraft parked adjacent to each other. The distance 326 may be determined based on safety regulations regarding aircraft and pedestrians (e.g., passengers waiting to board). Decreasing the distance 326 may be advantageous because a greater number of aircraft may parked on a landing pad at the same time. Additional space may also allow other types of vehicles to park next to an aircraft. For instance, a car parked nearby on the landing pad enables passengers to conveniently transition (e.g., reducing required walk time, and thus reducing overall trip time) between different types of transportation for a multi-modal trip. Though FIG. 3C illustrates the one-way direction of passenger traffic in a port-to-starboard direction, in other embodiments, the passenger traffic may be in a starboard-to-port direction or any other suitable direction or directions, for example, not necessarily in a straight line.

In some embodiments, a pilot of the aircraft 320 may verify that passengers have properly exited form and/or entered the cabin 324. For example, the pilot opens a hatch in a cockpit wall between the cockpit 328 and the cabin 324 to inspect the passengers, without necessarily having to leave the cockpit 328. During taxi, take-off, flight, and landing of the aircraft 320, the hatch may be secured such that passengers may not disturb or otherwise interfere with the pilot in the cockpit 328. In some embodiments, aircraft crew on a landing pad may assist the pilot to confirm proper passenger entry or exit. In addition, the pilot or crew may verify that passengers are correctly seated before take-off. For instance, the pilot inspects that passengers have fastened seatbelts, stowed any luggage in appropriate storage locations, positioned seatbacks in an upright position, etc. Though the embodiment shown in FIG. 3C includes the cockpit 328 positioned at the nose of the aircraft 320 (e.g., in front of the cabin 324), in other embodiments, the cockpit 328 may be in a different position. For instance, the cockpit 328 may be positioned behind or above the cabin 324, as described below with respect to FIG. 3D.

Figure 3D:
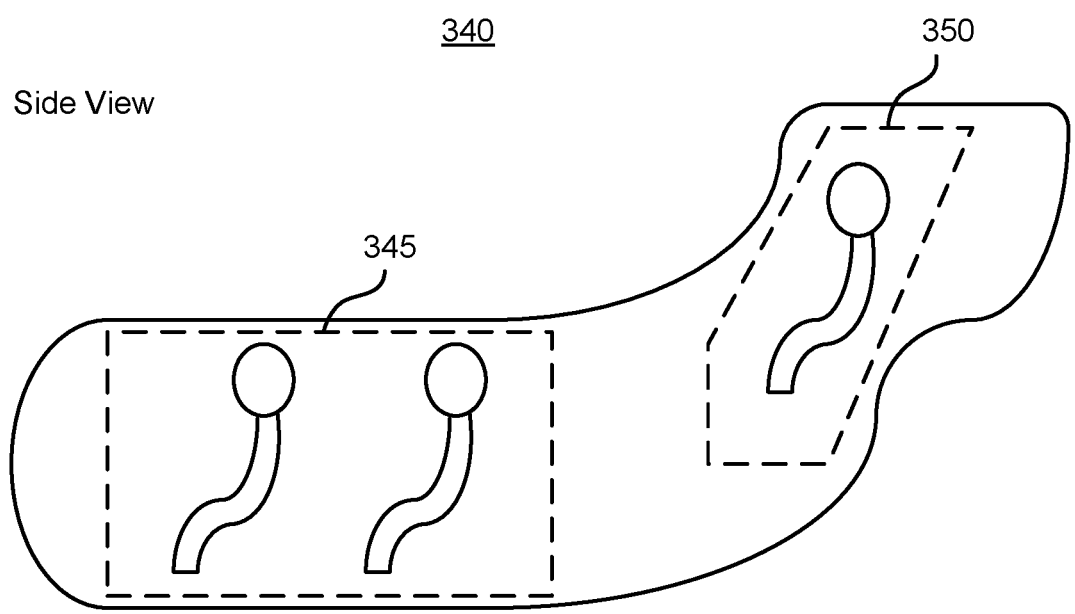
FIG. 3D is a diagram showing a cross-sectional side view of an aircraft according to one embodiment.

FIG. 3D is a diagram showing a cross-sectional side view of an aircraft 340 according to one embodiment. In contrast to the configuration of the aircraft 320 and 322 shown in FIG. 3C, the cabin 345 of the aircraft 340 shown in FIG. 3D is toward the nose of the aircraft 340, while the cockpit 350 is behind the cabin 345 and toward the tail of the aircraft 340. The cockpit 350 may be elevated to provide the pilot visibility to operate the aircraft, as well as to provide a field of view of passengers below in the cabin 345, e.g., to inspect passenger behavior such as verifying that passengers are properly seated before take-off. The pilot may enter or exit the aircraft 340 using a same door as passengers or a different door of the cockpit 350.

Figure 3E:
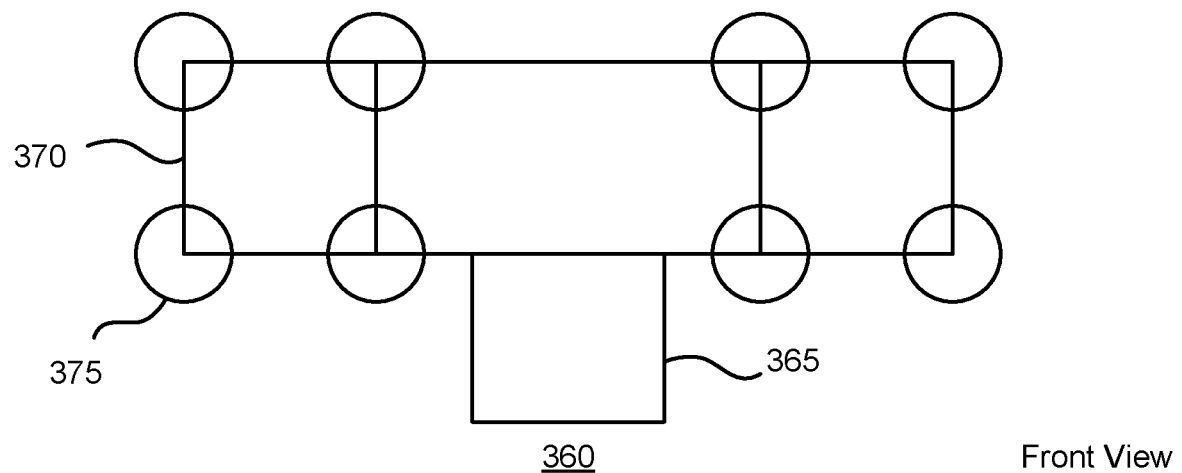
FIGS. 3E, 3F, and 3G are diagrams illustrating front views of aircraft and propellers according to various embodiments.
Figure 3F:
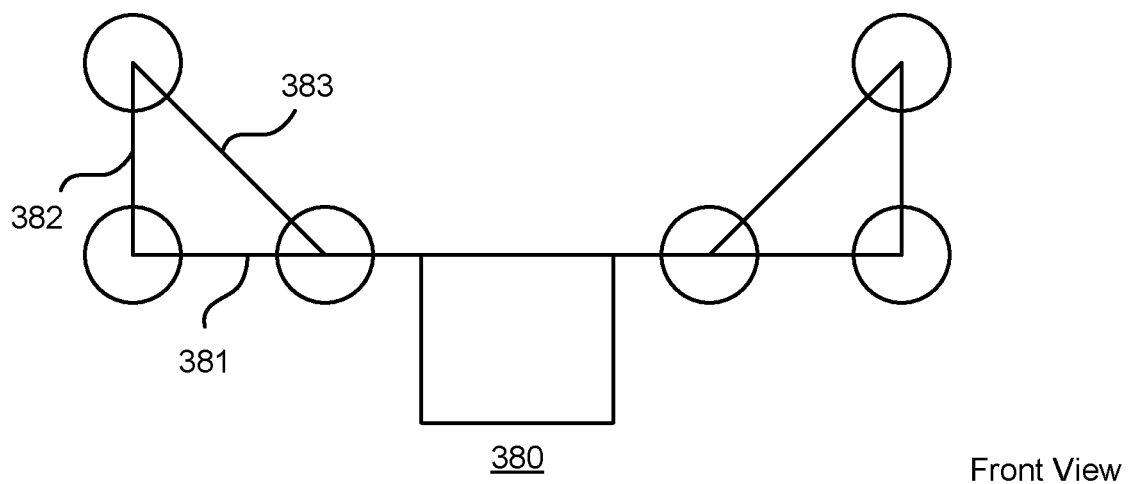
Figure 3G:
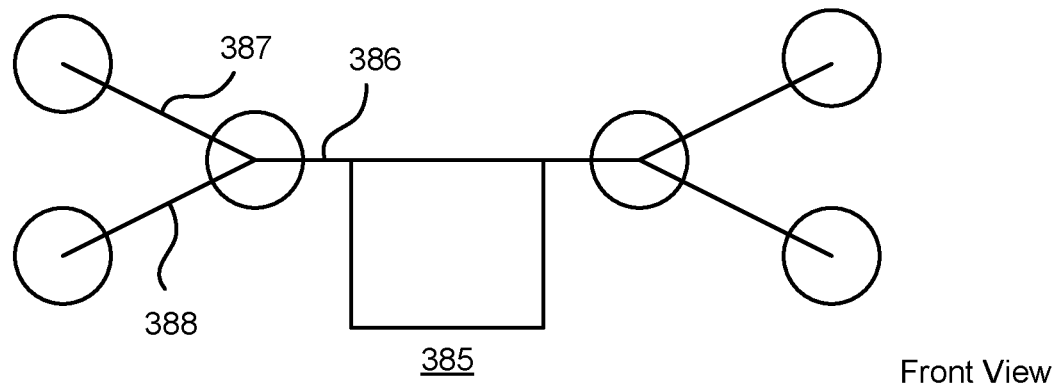

FIGS. 3E, 3F, and 3G are diagrams illustrating front views of aircraft and propellers according to various embodiments. The aircraft 360 shown in FIG. 3E includes a fuselage 365 (e.g., including a cabin and/or cockpit) and a structure 370 (e.g., including a truss or one or more wings) coupled to multiple distributed electric propellers 375 (e.g., powered rotors). In particular, the aircraft 360 shown in FIG. 3E includes at least eight distributed electric propellers 375 arranged in a two-by-four configuration on each of the port and starboard sides of the aircraft. The illustrated example shows the structure 370 coupled above the fuselage 365. In other embodiments, some or all of the structure 370 may be coupled to the sides, bottom, or edges of the fuselage 365.

The aircraft 380 shown in FIG. 3F includes at least six distributed electric propellers mounted on a triangular-shaped structure in contrast to the rectangular-shaped structure of the aircraft 360 of FIG. 3E. Due to the reduced number of distributed electric propellers and more compact truss structure design of the aircraft 380 relative to the aircraft 360, the aircraft 380 may be lighter in weight. The aircraft 380 includes a first wing on the port side and a second wing on the starboard side. Each of the wings may have a horizontal segment 381, a vertical segment 382 coupled orthogonally to the horizontal segment 381, and another segment 383 angled relative to the horizontal segment and the vertical segment. In the example shown in FIG. 3F, the angle segment 383 may be angled at (e.g., approximately) 45 degrees, though in other embodiments, the angle may vary. Accordingly, the triangular shape formed by the three segments may resemble an equilateral, isosceles, or scalene triangle. As shown in FIG. 3F, at least two distributed electric propellers may be coupled to the truss and positioned on a first (e.g., upper) plane. Additionally, at least four other distributed electric propellers may be coupled to the truss and positioned on a second (e.g., lower) plane.

FIG. 3G shows an aircraft 385 including at least six distributed electric propellers mounted on a "Y-shaped" truss structure, which may improve control of the aircraft 385 along the pitch axis, compared to other aircraft having coplanar distributed electric propellers, e.g., aircraft 360 and 380. The aircraft 385 may include distributed electric propellers positioned on at least two different planes. The aircraft 385 includes a first wing on the port side and a second wing on the starboard side. Each of the wings may have a horizontal segment 386 as well as an upper angled segment 387 and lower angled segment 388 coupled to the horizontal segment 386 at a joint. An angle between the upper and lower angled segments 387 and 388 may be an acute angle. In the example shown in FIG. 3G, a distributed electric propeller is coupled toward a distal end of the upper angled segment 387 of each wing. In addition, a distributed electric propeller is coupled toward a distal end of the lower angled segment 388 of each wing. Furthermore, a distributed electric propeller is coupled at the joint (of the Y-shape) of each wing. The six distributed electric propellers shown in the embodiment of FIG. 3G are positioned on three different planes, for instance, with at least two distributed electric propellers positioned on each plane.

In some embodiments, portions of the structure, distributed electric propellers, mounting parts, or other related mechanisms may be adjusted to different states. For instance, operation states of aircraft are shown in FIGS. 3E-G, though the aircraft may adjust into a more compact configuration for a storage or landing state.

IV. Example Seating Configurations

FIGS. 4A, 4B, 4C, 4D, 4E, 4F, 4G, 4H and 4I are diagrams illustrating top views of various seating arrangements of an aircraft according to various embodiments. It may be desirable to arrange seats in the cabin of an aircraft so that passengers feel safe flying in the aircraft, have space to stow their belongings or luggage, experience reduced turbulence (e.g., side-to-side swaying) to avoid motion sickness, have a wide view to the outside (e.g., not obstructed by a hatch or other structure of the aircraft), or any combination thereof. In addition to providing passengers with a suitable level of privacy and a comfortable amount of leg space or arm space, it may also be advantageous to arrange seats such that passengers can have the option to enjoy or interact in a common space with other passengers. Moreover, it may also advantageous to arrange the seats to make efficient use of the available space in the aircraft, balance weight of one or more passengers, a pilot, or luggage, and facilitate convenient and safe passenger ingress and egress. The seating arrangements shown in FIGS. 4A-I provide one or more of the above advantages for a cabin including at least three or four passenger seats and a cockpit for one pilot. In embodiments where the aircraft is autonomous, space for the pilot seat may be used instead for a passenger seat, or the cockpit space may be used as part of the cabin space or for storage. Further, in some use cases, one or more seats not used by a passenger may be converted (e.g., during a transition between different trips) into additional storage space, or additional seating space for a passenger who is present. In other embodiments, the aircraft may have different numbers of seats in the cabin and/or the cockpit.

Figure 4A:
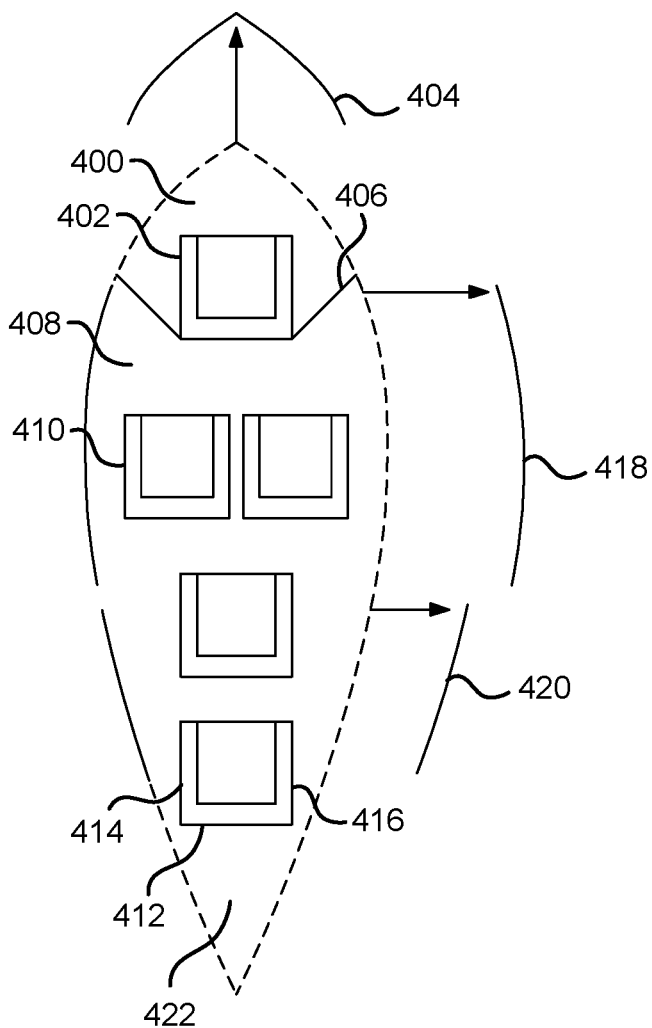
FIGS. 4A, 4B, 4C, 4D, 4E, 4F, 4G, 4H and 4I are diagrams illustrating top views of various seating arrangements of an aircraft according to various embodiments.

In the embodiment shown in FIG. 4A, a cockpit 400 of an aircraft includes a seat 402 for a pilot. A cockpit door 404 may open toward the nose of the aircraft for pilot ingress and egress without interfering with or slowing down passenger ingress and egress. Cockpit walls 406 separate the cockpit 400 from the cabin 408, and the cockpit walls 406 may be angled (e.g., relative to a lateral axis of the aircraft) to provide greater visibility (e.g., to view the environment outside the aircraft) toward the nose of the aircraft for passengers. The cockpit walls 406 may also protect the pilot from disturbances from passengers in the cabin 408.

The cabin 408 of the aircraft includes four seats 410 for passengers. One or more of the seats 410 may include a backrest 412, left armrest 414, or right armrest 416. Cabin doors may open laterally toward the port or starboard sides to increase the size of pathways for passengers to enter and exit the cabin. The aircraft may have any number of cabin doors on each side (e.g., port and starboard), for example, a front cabin door 418 for passengers seated toward the nose of the aircraft and a rear cabin door 420 for passengers seated toward the tail of the aircraft. In some embodiments, additional space toward the tail of the aircraft may be used for storage 422.

Figure 4B:
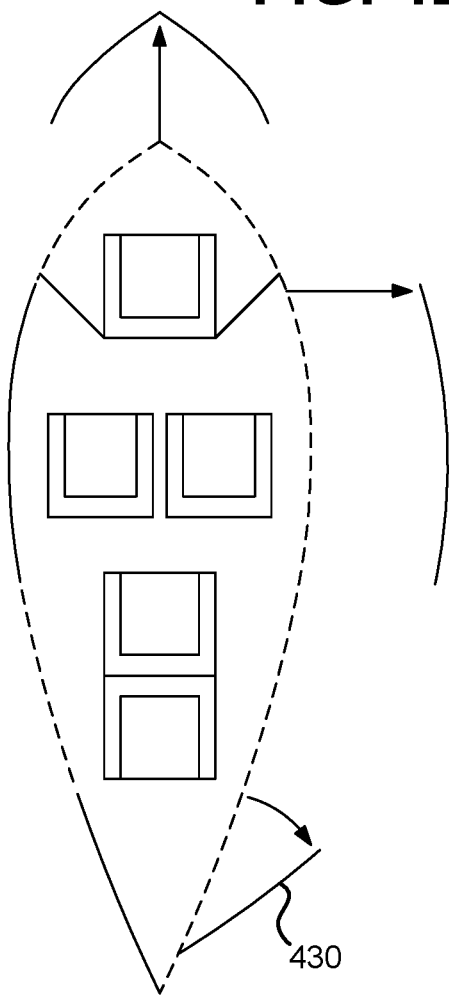
Figure 4C:
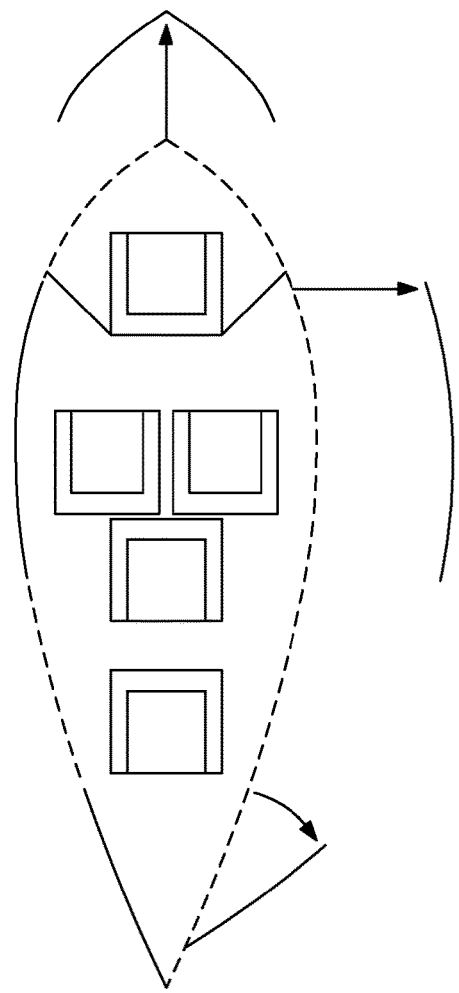

In the embodiment shown in FIG. 4B, the aircraft may include a rear (e.g., tail of the aircraft) facing passenger seat. In addition to cabin doors on the port and starboard sides, the cabin may also include one or more doors 430 toward the tail of the aircraft for passenger ingress and egress (e.g., from the rear facing passenger seat), or to access storage space in the tail of the aircraft. In the embodiment shown in FIG. 4C, the aircraft may include two rear facing passenger seats.

Figure 4D:
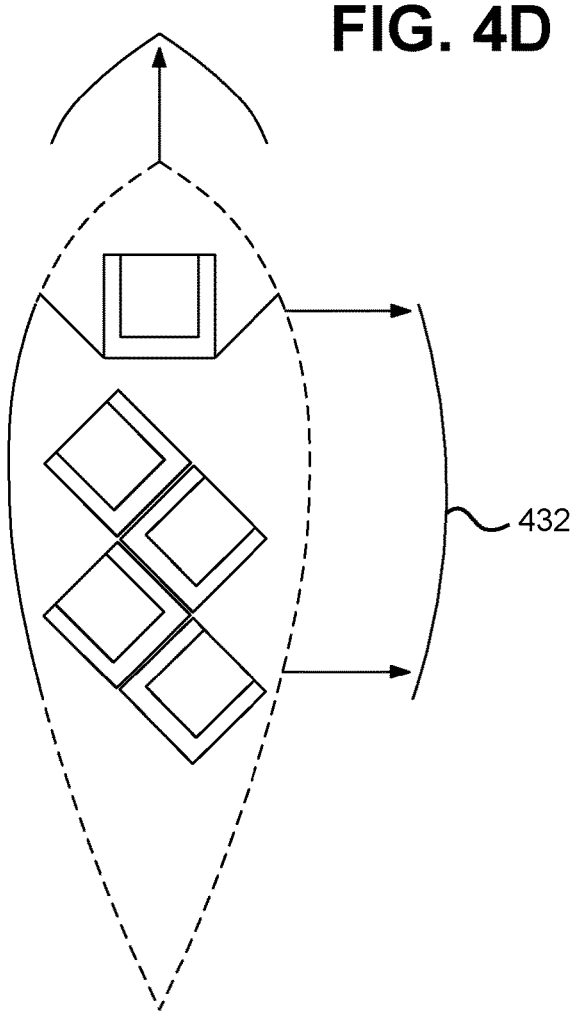

In the embodiment shown in FIG. 4D, the aircraft may include angled passenger seats to increase an amount of legroom for passengers, or to provide more direct visibility to windows of the cabin. Passengers corresponding to the seats facing the starboard direction may enter or exit the cabin via the starboard cabin door 432. Other passengers corresponding to the seats facing the port direction may enter or exit the cabin via a port cabin door.

Figure 4E:
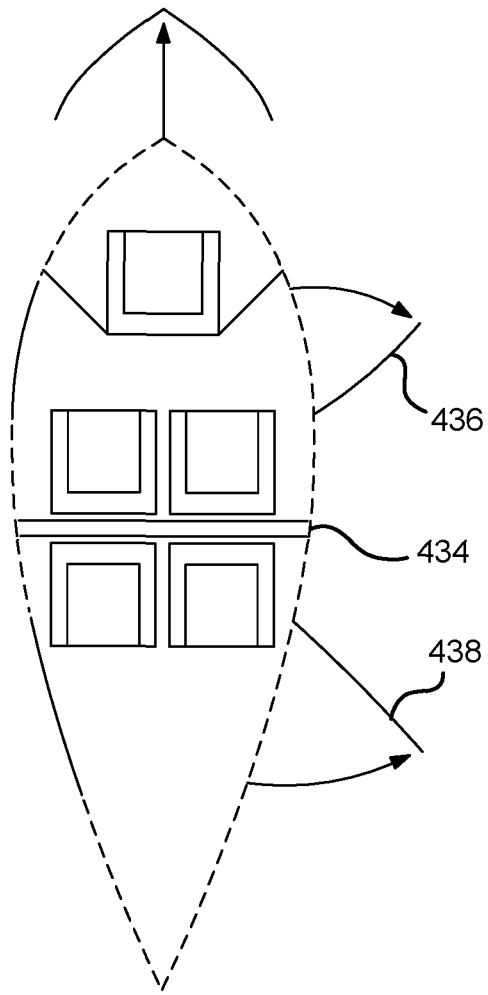

In the embodiment shown in FIG. 4E, the aircraft may include a structural band 434 separating the cabin into two sections, for example, to provide privacy between passengers in different sections. The structural band 434 may be positioned at or near the center of gravity of the aircraft. Since the seats face away from the structural band 434, the structural band 434 does not interrupt the viewing angle or visibility of passengers. In some embodiments, cabin doors for the two sections may rotate outwards (e.g., independently from the other cabin doors) for passenger ingress and egress. For instance, from the top view, the front cabin door 436 rotates clockwise to open, while the rear cabin door 438 rotates counter-clockwise to open.

Figure 4F:
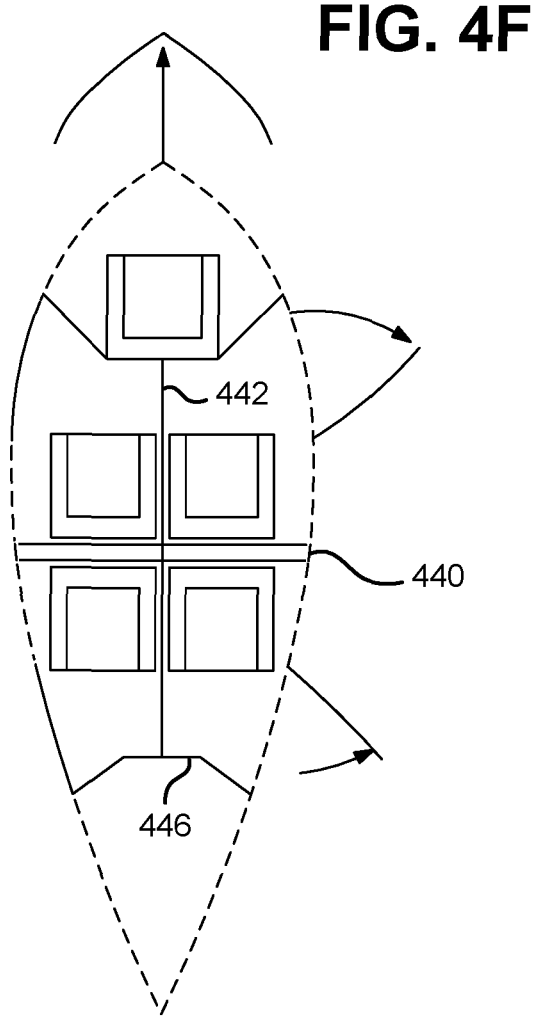

In the embodiment shown in FIG. 4F, the aircraft may include one or more privacy walls 442 configured to provide privacy between two or more passengers in the front section, and two or more passengers in the rear section, of the cabin as divided by the structural band 440. Privacy walls 442 or structural bands 440 may be formed using opaque materials, transparent materials (e.g., glass or plastic), semi-transparent materials, translucent materials, or any combination thereof. Privacy walls 442 or structural bands 440 may include noise insulation material such that passengers can take phone or video calls without interrupting others, or becoming interrupted, while riding in the aircraft. The privacy walls may also define a storage space in the tail of the aircraft. In an embodiment, up to four passengers may each enter and exit from the cabin from a different cabin door, which may open to the side according to the corresponding seat orientation (e.g., forward or rear facing). The cabin may also include a wall 446 that separates the cabin from a storage space toward the tail of the aircraft.

Figure 4G:
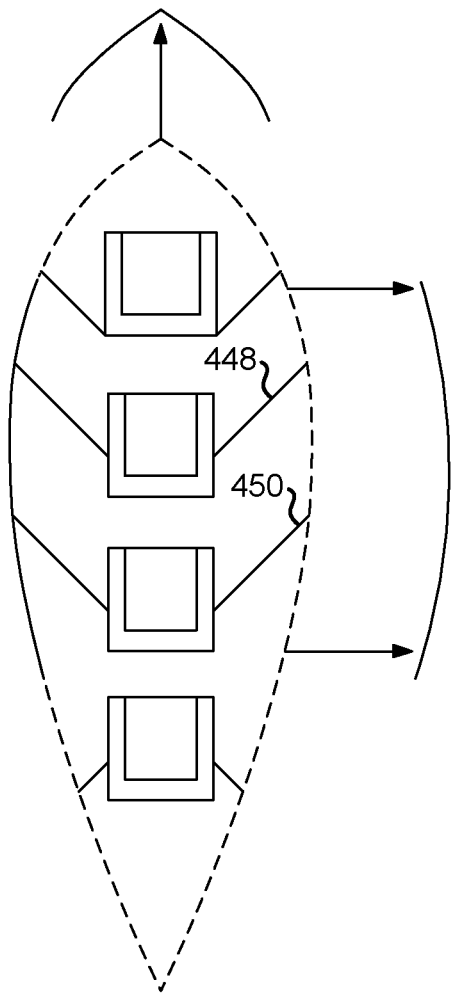

In the embodiment shown in FIG. 4G, the aircraft includes three seats aligned behind the pilot seat. Privacy walls 448 and 450 separate the cabin into individual sections for each of the passengers, and the privacy walls may be angled to increase passenger visibility, e.g., toward the noise of the aircraft. In other embodiments, privacy walls or structural bands may divide the cabin into any other number of sections, each of which may include any number of seats for passengers. Different sections may vary in footprint size, number of seats, or other attributes.

Figure 4H:
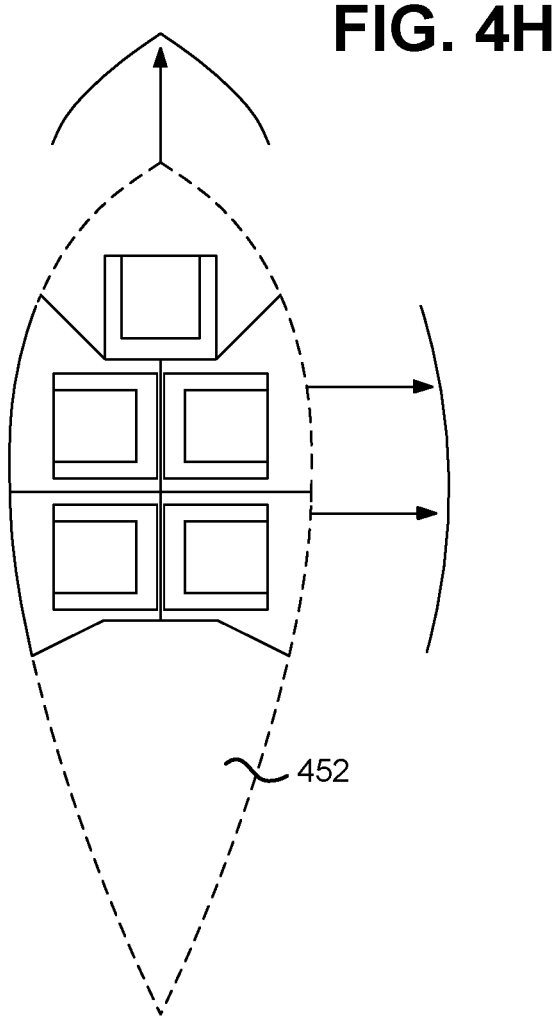

In the embodiment shown in FIG. 4H, the aircraft includes seats that face the port and starboard sides of the aircraft, which may reduce the overall footprint of the seats in the cabin, and thus increase the available storage space 452 toward the tail of the aircraft. In some embodiments, by reducing the overall footprint of the seats in the cabin, the aircraft may have additional space for other components such as a batteries, sensors, or actuators, e.g., for powered rotors. Furthermore, by reducing the overall footprint, the aircraft may also be manufactured to be more compact or to save material or weight. Compared to a heavier aircraft otherwise with similar attributes, a lighter aircraft may be able to achieve a greater range of flight on a battery charge.

Figure 4I:
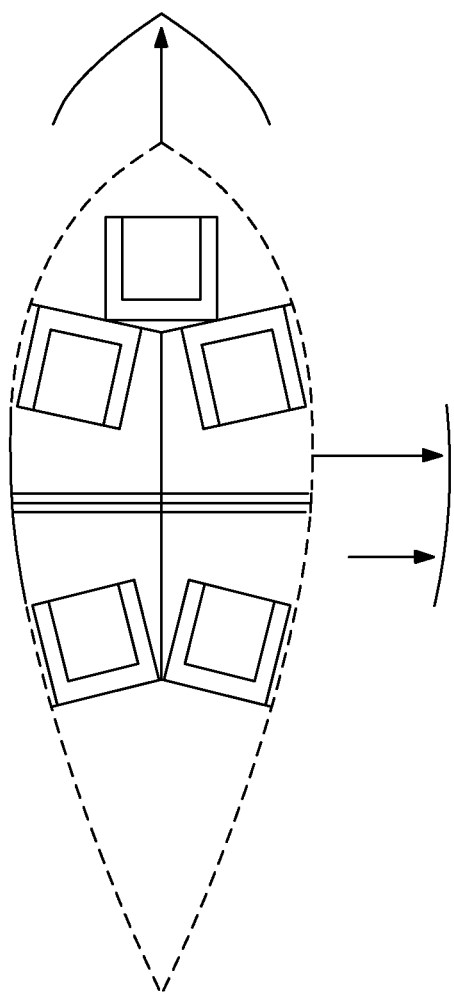

In the embodiment shown in FIG. 4I, the aircraft includes two front seats angled to face the tail of the aircraft and two rear seats angles to face the nose of the aircraft. The aircraft includes one port and one starboard cabin door, each of which allows two passengers from the port and starboard sides, respectively, to simultaneously enter or exit the cabin.

Figure 5:
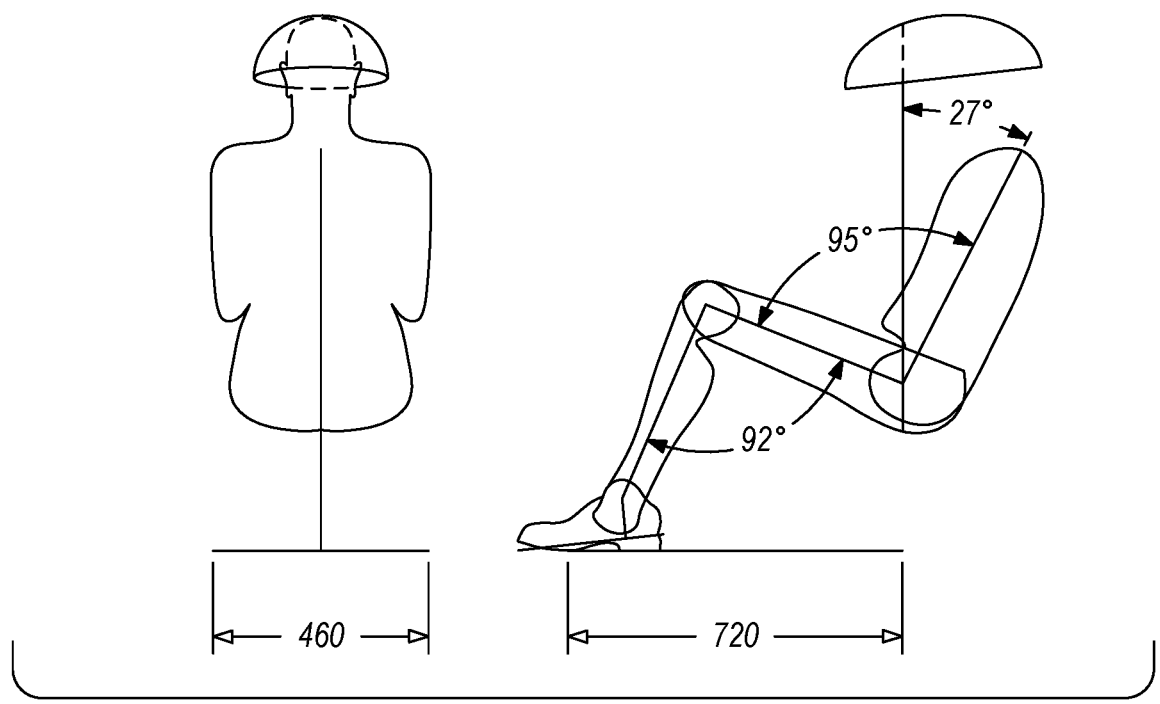
FIG. 5 illustrates dimensions for a seat of an aircraft according to one embodiment.

FIG. 5 illustrates dimensions for a seat of an aircraft according to one embodiment. In the illustrated embodiment, the seat width and length dimensions as illustrated may be 460 millimeters and 720 millimeters, respectively. Dimensions of a seat for passengers or a pilot may be determined based on statistics such as an average height, length of legs, length or width of torso, or weight of a certain population. The population may represent the 95' percentile of males in a geographical area or another population having different parameters. In some embodiments, dimensions of the seat may also be determined to allow a passenger to sit with up to a 27 degree back incline from vertical, a 95 degree angle between the back and upper leg (e.g., thigh or lap), or a 92 degree angle between the upper leg and lower leg. The seat may be adjustable to accommodate passengers of different sizes. Furthermore, the seat may be switched between one or more configurations such as an upright and reclined position.

FIGS. 6, 7, 8, 9, 10, 11, 12, 13, 14, 15, and 16 are diagrams illustrating various seating configurations of an aircraft according to various embodiments. In some embodiments, the dimensions shown in FIGS. 6-16 are in millimeters (mm), though in other embodiments, other units or dimensions for the aircraft may be used. The height of the aircraft cabins in the embodiments shown in FIGS. 6-16 is 1254 mm, for instance, to accommodate for the dimensions of the seat of the aircraft shown in FIG. 5. In other embodiments, a cabin of an aircraft 120 may have a different height, or the height may be non-uniform along at least a portion of the length or width of the cabin.

Figure 6:
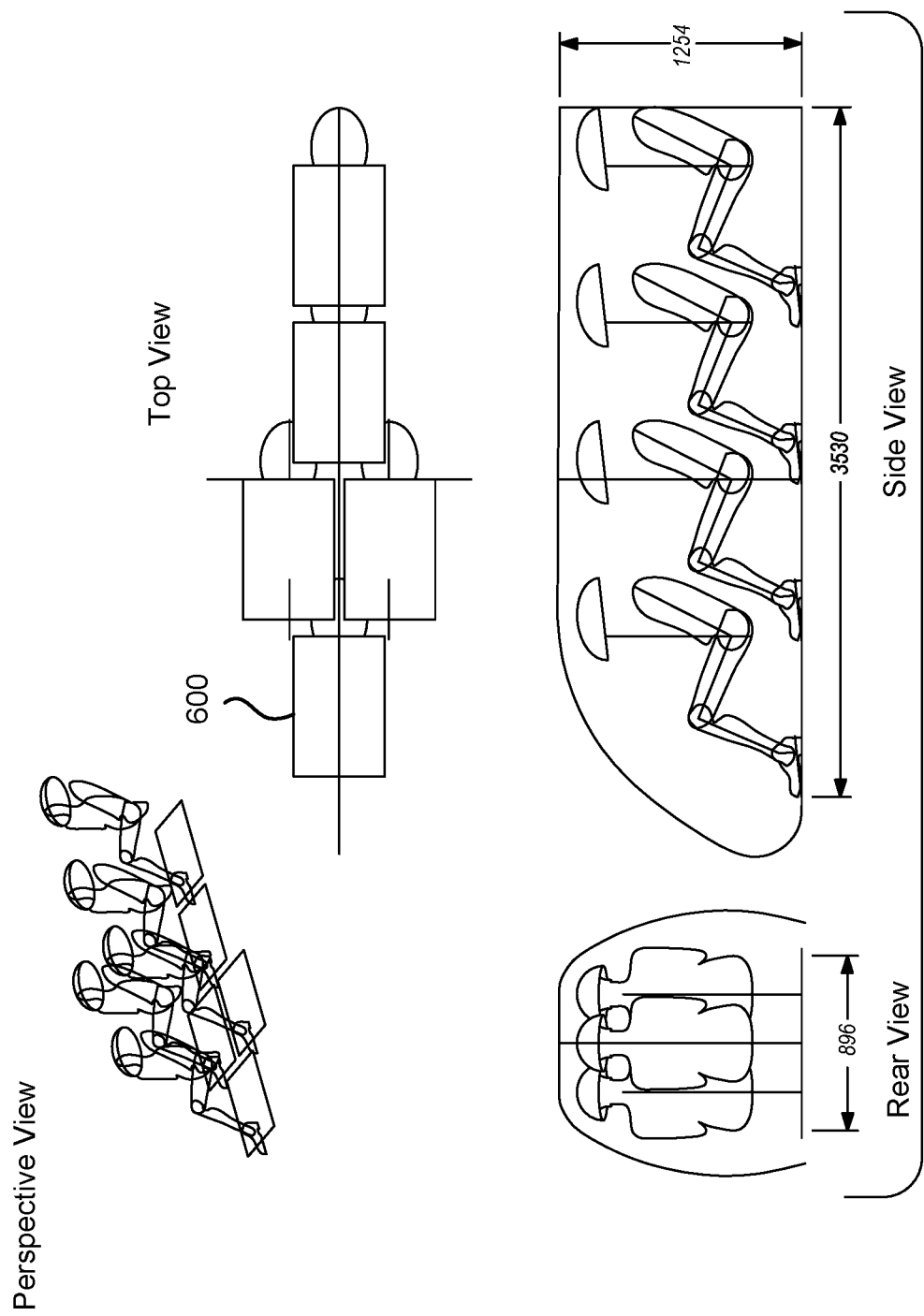
FIGS. 6, 7, 8, 9, 10, 11, 12, 13, 14, 15, and 16 are diagrams illustrating various seating configurations of an aircraft according to various embodiments.

The example seating configuration shown in FIG. 6 includes five seats, where a front seat 600 may be designated for a pilot. The front seat of any one of the seating configurations shown in FIGS. 6-16 may be for a pilot. In embodiments where the aircraft is autonomously operated, there may not necessarily be a designated seat for a pilot. The width and length dimensions of a footprint of the seating configuration are 896 mm and 3530 mm, respectively. As illustrated in the side view of FIG. 6, a portion of an area underneath a seat may be used as foot or leg space for another passenger.

Figure 7:
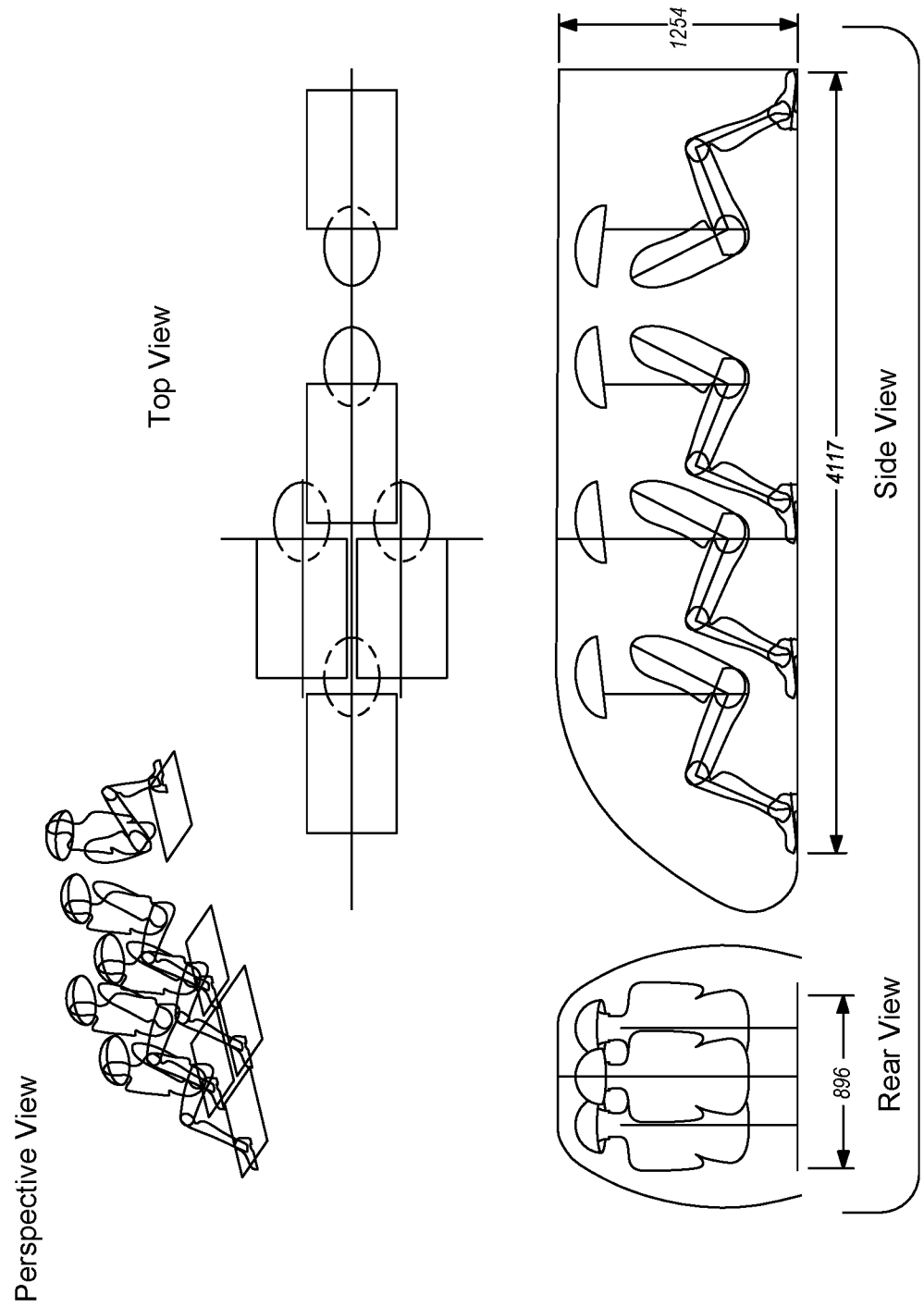
Figure 8:
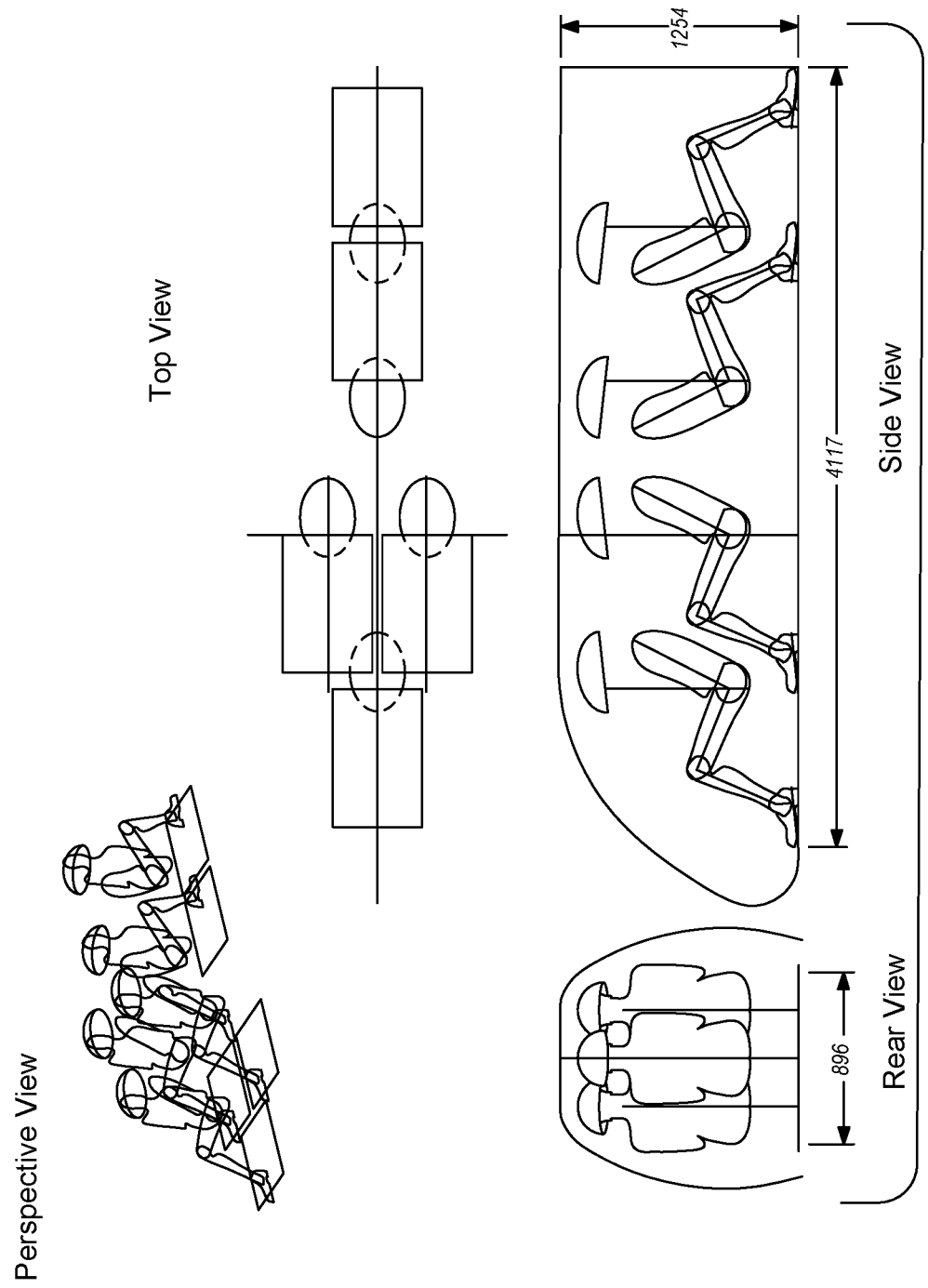

The example seating configurations shown in FIGS. 7-8 include five seats, where at least one of the seats are rear-facing toward a tail of the aircraft. The width and length dimensions of a footprint of the seating configurations are 896 mm and 4117 mmm, respectively. Though not shown in FIGS. 7-8, the aircraft may include one or more structural bands or privacy walls to separate the forward-facing and rear-facing seats.

Figure 9:
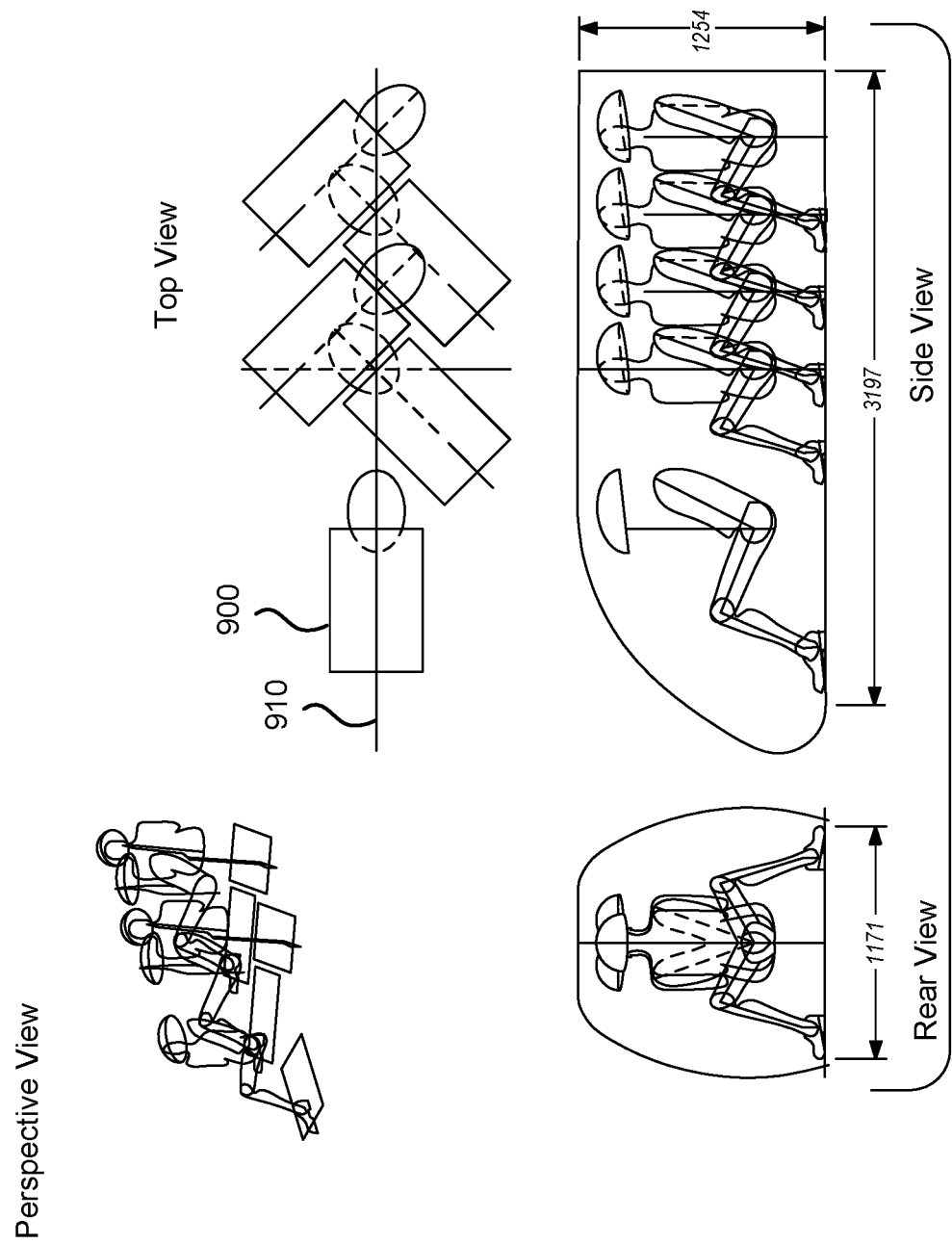

The example seating configuration shown in FIG. 9 includes five seats, where four of the seats are angled, relative to a lateral axis 910, toward the port or starboard side of the aircraft. The lateral axis 910 may be aligned to centerline or line of symmetry to help balance weight of passengers in the aircraft. The front seat 900 may not be angled because the front seat 900 may be designated for a pilot. The width and length dimensions of a footprint of the seating configuration are 1171 and 3197, respectively.

Figure 10:
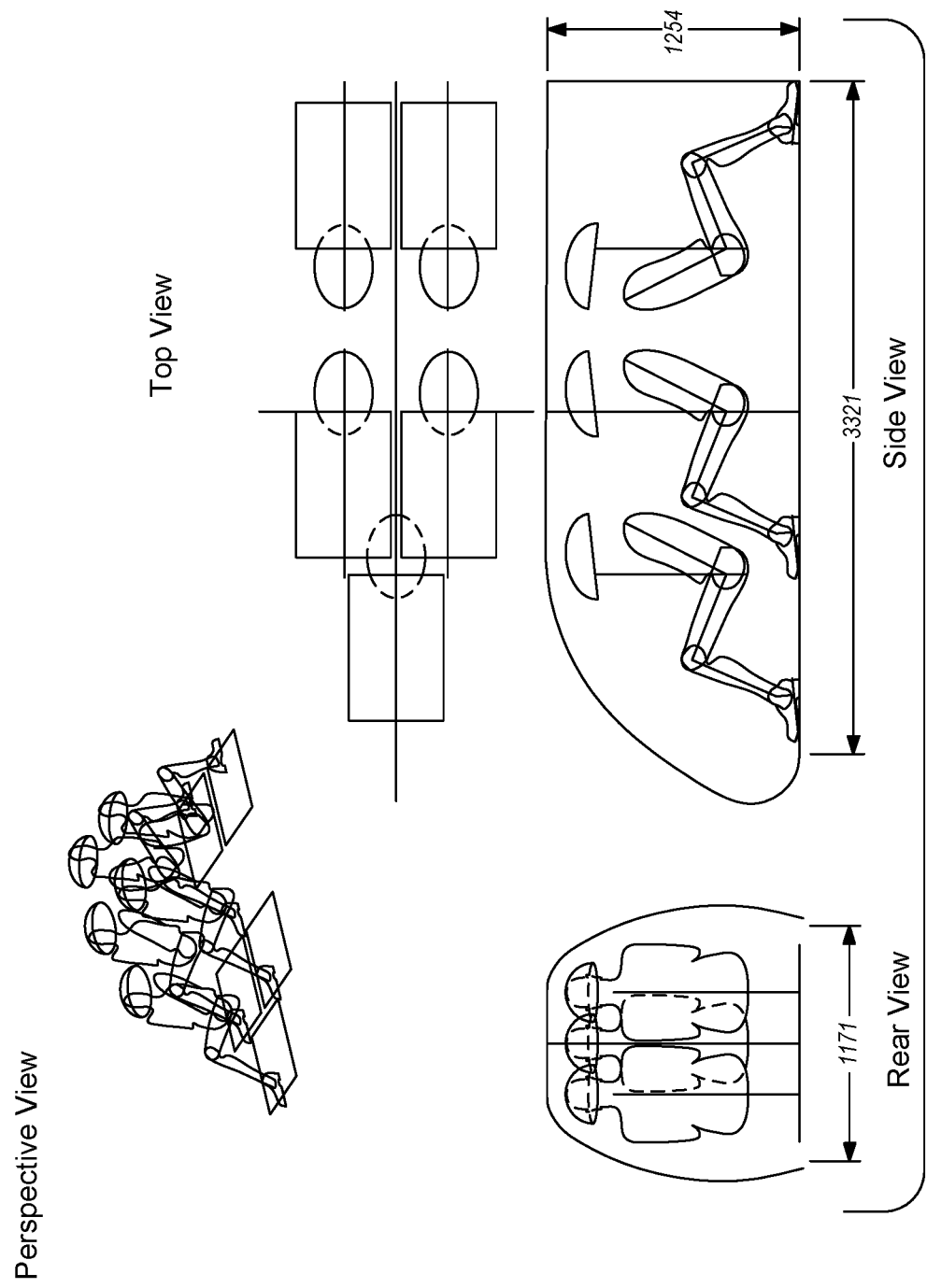

The example seating configuration shown in FIG. 10 includes five seats, where a row of two seats face the nose of the aircraft and another row of two seats face the tail of the aircraft. The width and length dimensions of a footprint of the seating configuration are 1171 and 3321, respectively.

Figure 11:
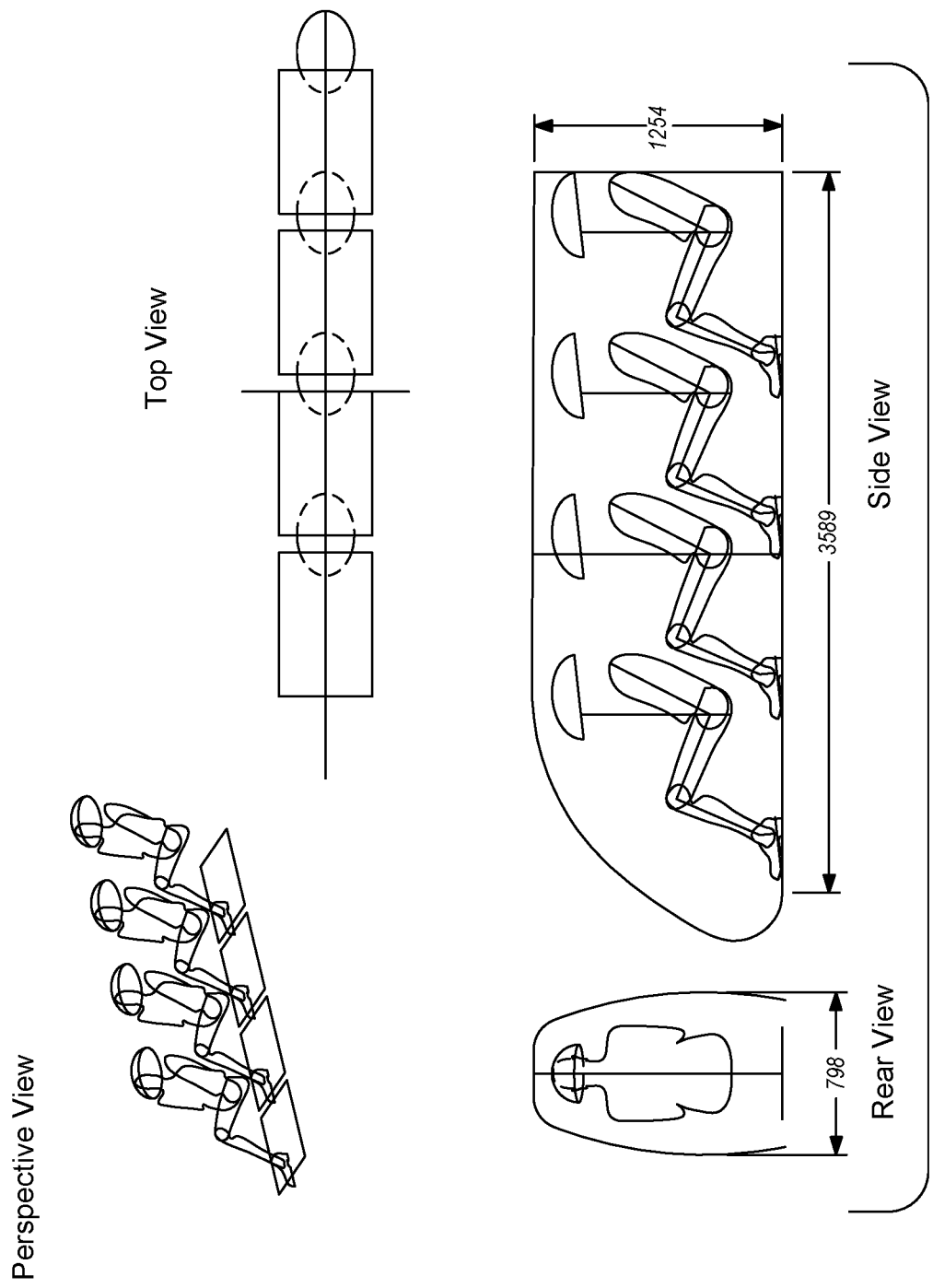

The example seating configuration shown in FIG. 11 includes four seats aligned along a lateral axis of an aircraft. The width and length dimensions of a footprint of the seating configuration are 798 and 3589, respectively.

Figure 12:
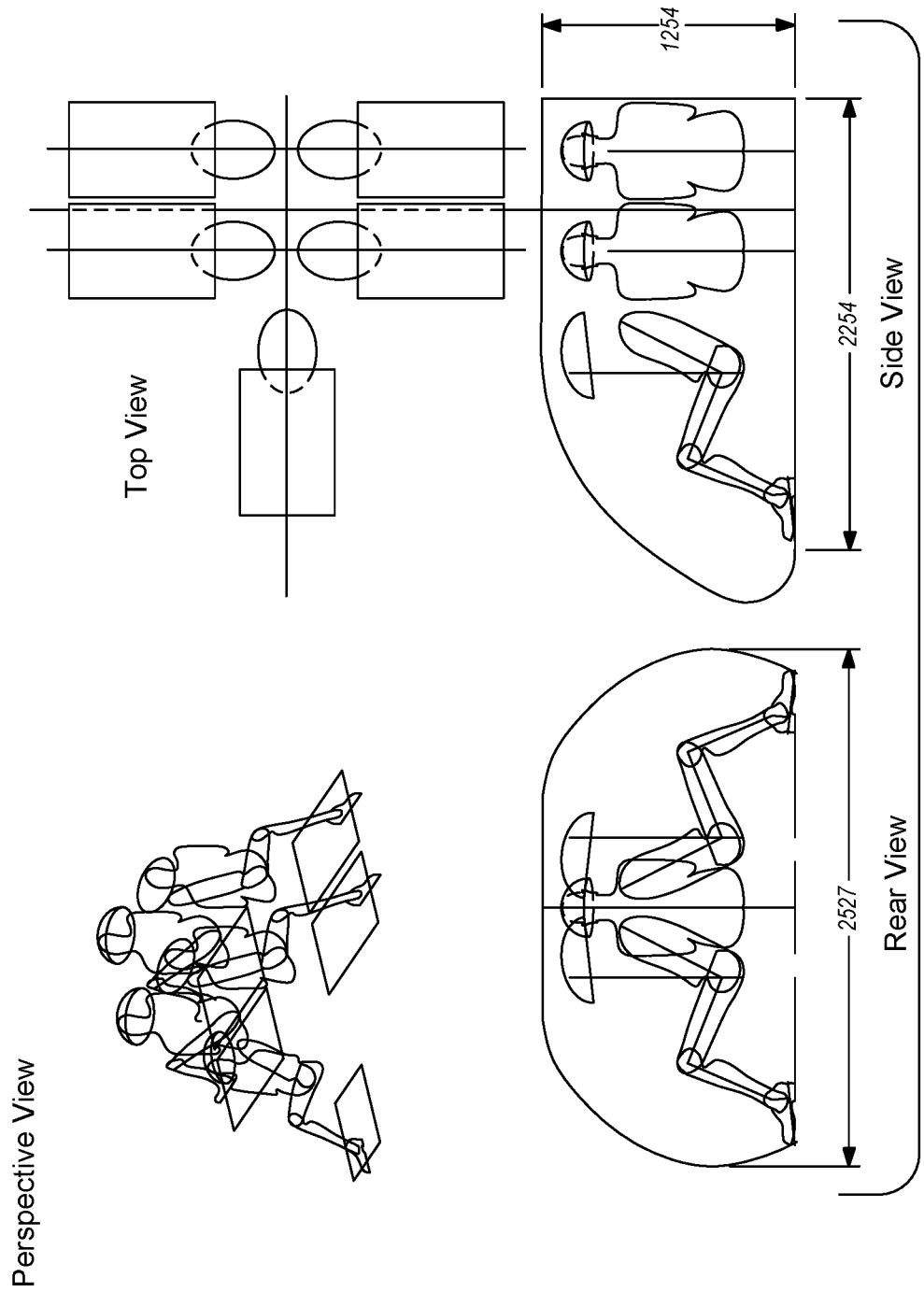

The example seating configuration shown in FIG. 12 includes five seats, where a row of two seats face the port side of the aircraft and another row of two seats face the starboard side of the aircraft. The width and length dimensions of a footprint of the seating configuration are 2527 and 2254, respectively.

Figure 13:
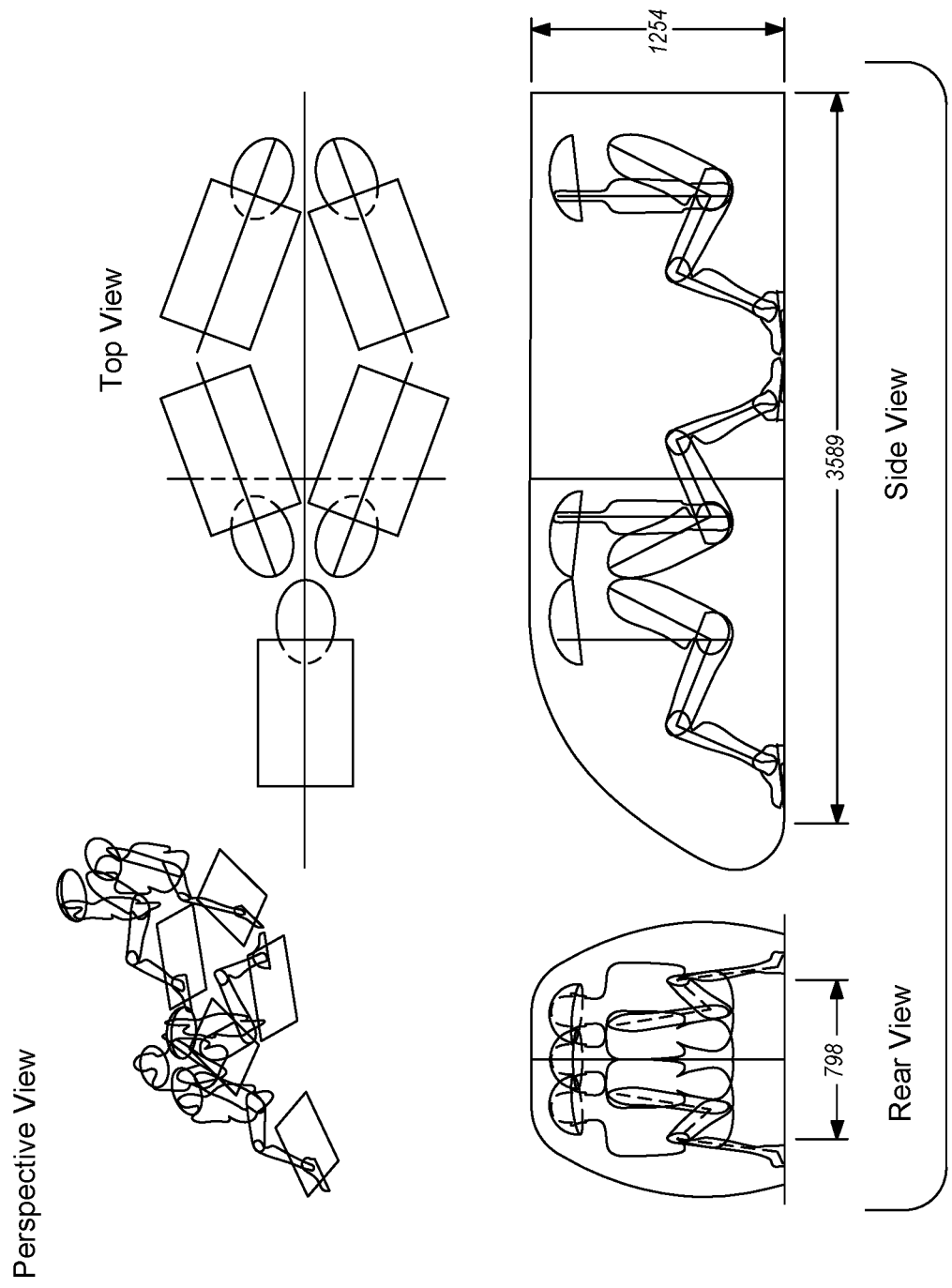

The example seating configuration shown in FIG. 13 includes five seats, where four of the seat are offset an angle relative to a lateral axis of the aircraft. The width and length dimensions of a footprint of the seating configuration are 798 and 3589, respectively.

Figure 14:
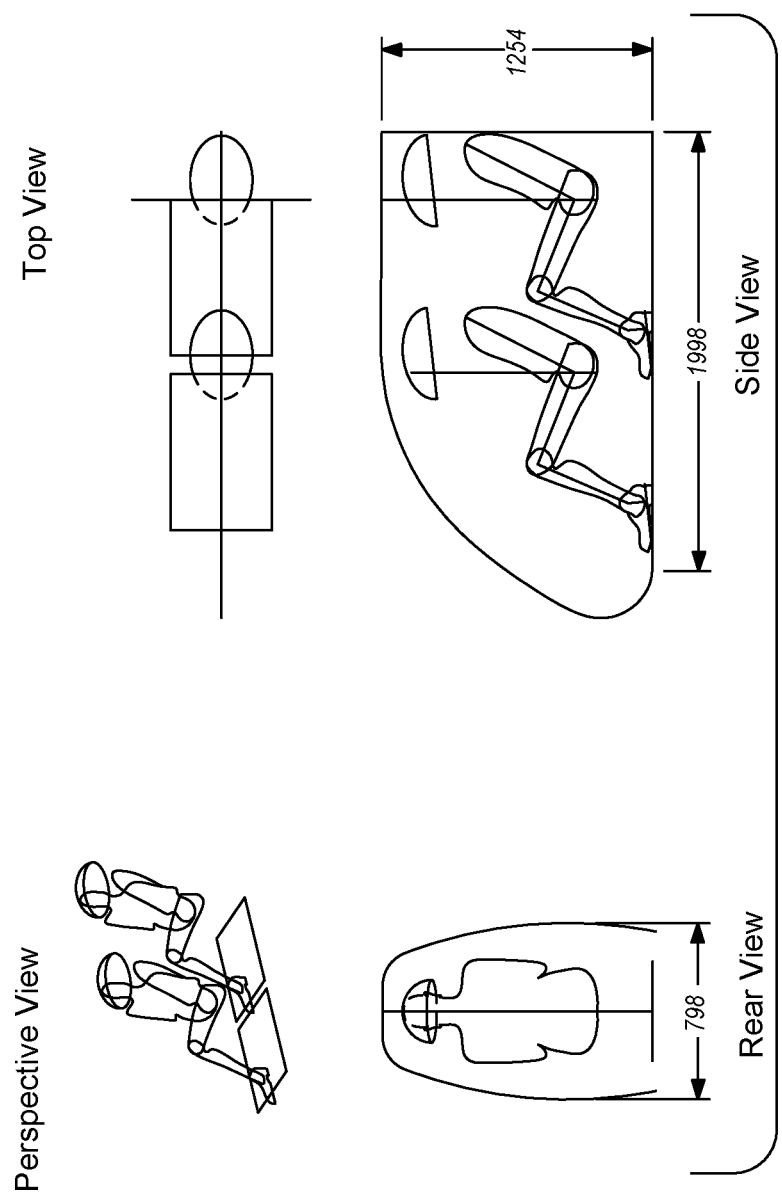

The example seating configuration shown in FIG. 14 includes two seats aligned along a lateral axis of an aircraft. The width and length dimensions of a footprint of the seating configuration are 798 and 1998, respectively.

Figure 15:
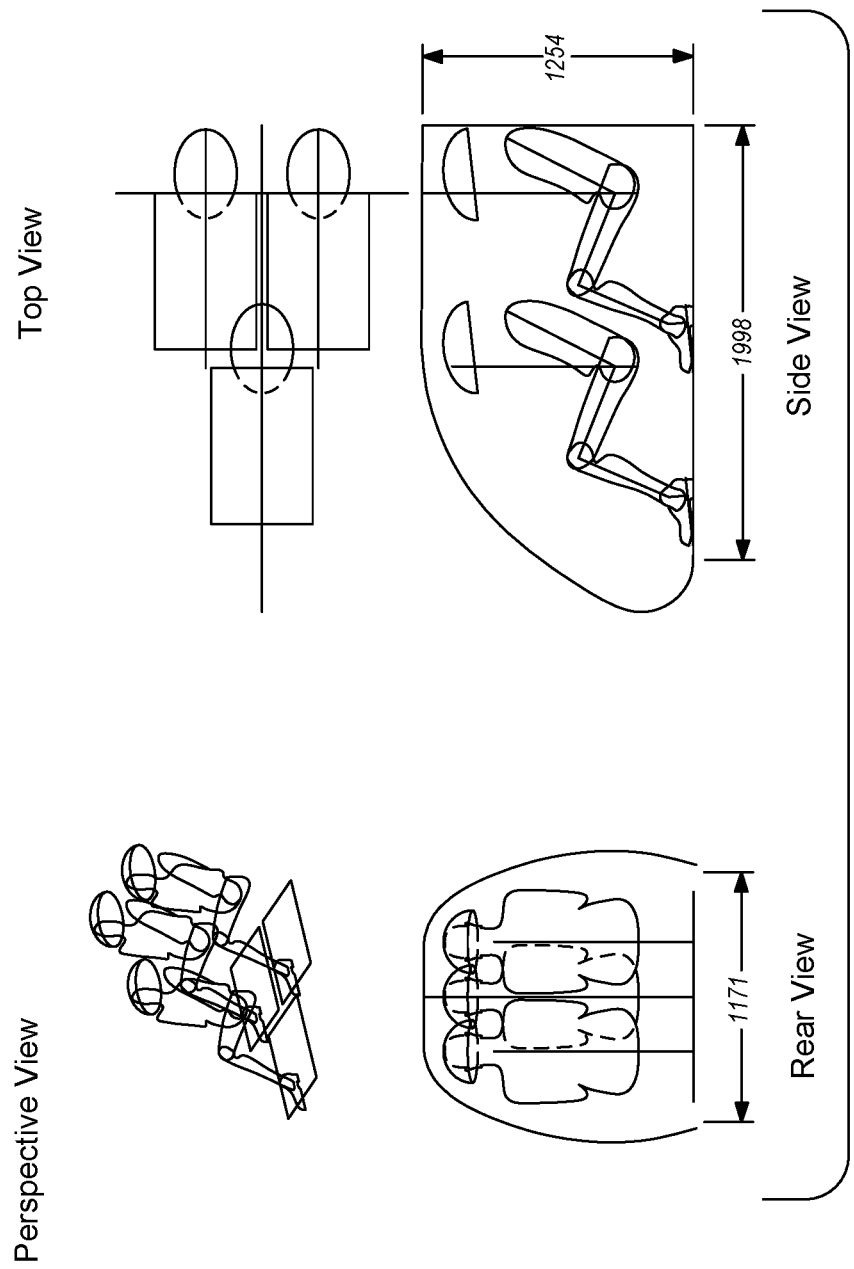

The example seating configuration shown in FIG. 15 includes three seats, where a row of two seats are positioned behind a third seat. The width and length dimensions of a footprint of the seating configuration are 1171 and 1998, respectively.

Figure 16:
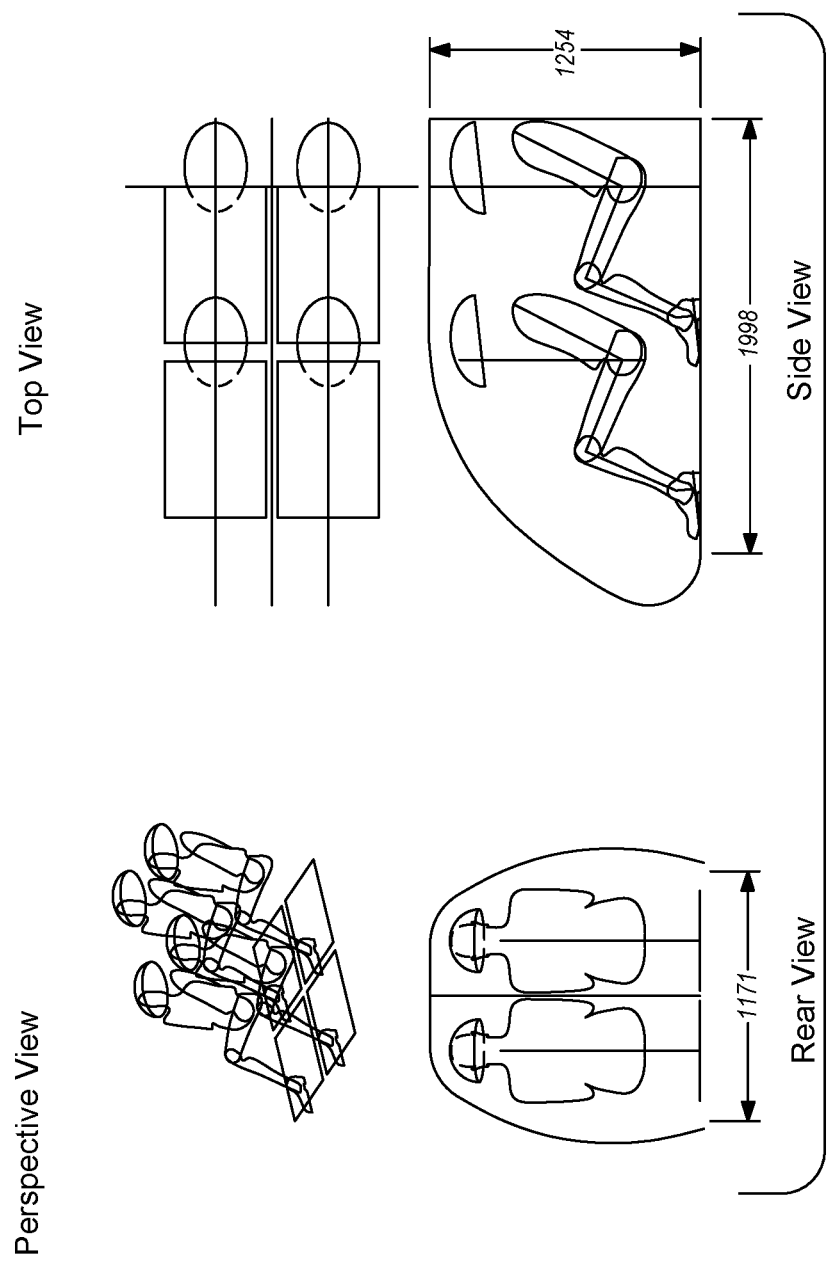

The example seating configuration shown in FIG. 16 includes two rows of two seats each facing the nose of the aircraft. The width and length dimensions of a footprint of the seating configuration are 1171 and 1998, respectively.

V. Additional Configurations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for controlling aircraft doors, comprising:
   determining, using one or more processors, that a VTOL aircraft is ready for egress of one or more passengers or goods at a vertiport, wherein the one or more passengers or goods are transported by the VTOL aircraft for a first trip segment of a multi-modal trip, wherein the VTOL aircraft comprises: a port cabin door located on a port side of the VTOL aircraft, and a starboard cabin door located on a starboard side of the VTOL aircraft;
   determining, using the one or more processors, that a vehicle configured for traveling a second trip segment of the multi-modal trip is or will be located at the vertiport;
   determining, using the one or more processors, that a direction of passenger traffic to the vehicle is nearest one of the port side of the VTOL aircraft or the starboard side of the VTOL aircraft; and
   providing, using the one or more processors, an instruction to open one of the port cabin door or the starboard cabin door corresponding to the one of the port side of the VTOL aircraft or the starboard side of the VTOL aircraft based at least in part on the direction of passenger traffic to the vehicle.

2. The computer-implemented method of claim 1, further comprising:
   transmitting, using the one or more processors, data indicative of a message for the one or more passengers of the VTOL aircraft for presentation via an electronic display, the message indicating egress via one of the port cabin door or the starboard cabin door.

3. The computer-implemented method of claim 1, further comprising:
   transmitting, using the one or more processors, data indicative of a message for display on one or more client devices of the one or more passengers, the message indicating egress via one of the port cabin door or the starboard cabin door.

4. The computer-implemented method of claim 1, further comprising:
   providing, using the one or more processors, an additional instruction to open another one of the port cabin door or the starboard cabin door for ingress of one or more additional passengers or goods at the vertiport.

5. The computer-implemented method of claim 1, wherein the VTOL aircraft comprises a second port cabin door located on the port side of the VTOL aircraft and a second starboard cabin door located on the starboard side of the VTOL aircraft, and wherein the instruction to open comprises an instruction to open: (i) at least one of the port cabin door or the second port cabin door, or (ii) at least one of the starboard cabin door or the second starboard cabin door.

6. The computer-implemented method of claim 1, wherein the VTOL aircraft comprises a cabin comprising a plurality of seats, the plurality of seats comprising a pilot seat for a pilot toward a nose of the VTOL aircraft and four passenger seats for the one or more passengers behind the pilot seat.

7. The computer-implemented method of claim 6, wherein the four passenger seats comprise a first pair of passenger seats located toward the nose of the VTOL aircraft and a second pair of passenger seats positioned behind the first pair of passenger seats and located toward a tail of the VTOL aircraft.

8. The computer-implemented method of claim 1, wherein the one or more processors are located on-board the VTOL aircraft.

9. The computer-implemented method of claim 1, wherein the one or more processors are located off-board the VTOL aircraft.

10. A computer-implemented method for controlling aircraft doors, comprising:
    determining, using one or more processors, that a vehicle configured for traveling a first trip segment of a multi-modal trip is or will be located at a vertiport;
    determining, using the one or more processors, that a VTOL aircraft is ready for ingress of one or more passengers or goods at the vertiport, wherein the one or more passengers or goods are transported by the VTOL aircraft for a second trip segment of the multi-modal trip, wherein the VTOL aircraft comprises: a port cabin door located on a port side of the VTOL aircraft, and a starboard cabin door located on a starboard side of the VTOL aircraft;
    determining, using the one or more processors, that a direction of passenger traffic from the vehicle is nearest one of the port side of the VTOL aircraft or the starboard side of the VTOL aircraft; and
    providing, using the one or more processors, an instruction to open one of the port cabin door or the starboard cabin door corresponding to the one of the port side of the VTOL aircraft or the starboard side of the VTOL aircraft based at least in part on the direction of passenger traffic from the vehicle.

11. The computer-implemented method of claim 10, comprising providing, using the one or more processors, an additional instruction to open another one of the port cabin door or the starboard cabin door for egress of one or more additional passengers or goods at the vertiport.

12. The computer-implemented method of claim 10, wherein the VTOL aircraft comprises a second port cabin door located on the port side of the VTOL aircraft and a second starboard cabin door located on the starboard side of the VTOL aircraft, and wherein the instruction to open comprises an instruction to open: (i) at least one of the port cabin door or the second port cabin door, or (ii) at least one of the starboard cabin door or the second starboard cabin door.

13. The computer-implemented method of claim 10, wherein the VTOL aircraft comprises a cabin comprising a plurality of seats, the plurality of seats comprising a pilot seat for a pilot toward a nose of the VTOL aircraft and four passenger seats for the one or more passengers behind the pilot seat.

14. The computer-implemented method of claim 13, wherein the four seats for the one or more passengers comprise a first pair of passenger seats located toward the nose of the VTOL aircraft and a second pair of passenger seats positioned behind the first pair of passenger seats and located toward a tail of the VTOL aircraft.

15. The computer-implemented method of claim 10, wherein the one or more processors are located on-board the VTOL aircraft.

16. The computer-implemented method of claim 10, wherein the one or more processors are located off-board the VTOL aircraft.

17. A computing system, comprising:
    one or more processors; and
    a computer program product comprising a non-transitory computer readable storage medium having instructions encoded thereon that, when executed by the one or more processors, cause the one or more processors to perform operations comprising:

determining that a VTOL aircraft is ready for egress of one or more passengers or goods at a vertiport, wherein the one or more passengers or goods are transported by the VTOL aircraft for a first trip segment of a multi-modal trip, wherein the VTOL aircraft comprises:
- a port cabin door located on a port side of the VTOL aircraft, and
- a starboard cabin door located on a starboard side of the VTOL aircraft;

determining that a vehicle configured for traveling a second trip segment of the multi-modal trip is or will be located at the vertiport;

determining that a direction of passenger traffic to the vehicle is nearest one of the port side of the VTOL aircraft or the starboard side of the VTOL aircraft; and providing an instruction to open one of the port cabin door or the starboard cabin door corresponding to the one of the port side of the VTOL aircraft or the starboard side of the VTOL aircraft based at least in part on the direction of passenger traffic to the vehicle.

18. The computing system of claim 17, the operations further comprising:

transmitting data indicative of a message for the one or more passengers of the VTOL aircraft for presentation via an electronic display, the message indicating egress via one of the port cabin door or the starboard cabin door.

19. The computing system of claim 17, the operations further comprising:

transmitting data indicative of a message for display on one or more client devices of the one or more passengers, the message indicating egress via one of the port cabin door or the starboard cabin door.

20. The computing system of claim 17, wherein the VTOL aircraft comprises a second port cabin door located on the port side of the VTOL aircraft and a second starboard cabin door located on the starboard side of the VTOL aircraft, and wherein the instruction to open comprises an instruction to open: (i) the port cabin door and the second port cabin door, or (ii) the starboard cabin door and the second starboard cabin door.

* * * * *